US012562837B2

(12) United States Patent　　　(10) Patent No.:　US 12,562,837 B2
Elshafie et al.　　　　　　　　　　　(45) Date of Patent:　Feb. 24, 2026

(54) PRIORITY AND FEEDBACK FOR RATE SPLIT SCHEMES

(71) Applicant: QUALCOMM Incorporated, San Diego, CA (US)

(72) Inventors: Ahmed Elshafie, San Diego, CA (US); Ahmed Abdelaziz Ibrahim Abdelaziz Zewail, San Diego, CA (US); Ahmed Attia Abotabl, San Diego, CA (US); Marwen Zorgui, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 18/076,687

(22) Filed: Dec. 7, 2022

(65) Prior Publication Data

US 2024/0195523 A1　　Jun. 13, 2024

(51) Int. Cl.
*H04L 1/00*　　　　(2006.01)
*H04W 72/0446*　　(2023.01)
*H04W 72/21*　　　(2023.01)

(52) U.S. Cl.
CPC ....... *H04L 1/0013* (2013.01); *H04W 72/0446* (2013.01); *H04W 72/21* (2023.01)

(58) Field of Classification Search
CPC ................. H04L 1/1854; H04L 1/0013; H04L 2001/0093; H04W 72/0446; H04W 72/21
See application file for complete search history.

(56) References Cited

U.S. PATENT DOCUMENTS

| | | | | |
|---|---|---|---|---|
| 2011/0218000 A1* | 9/2011 | Noh .................... | H04W 52/267 | |
| | | | 455/501 | |
| 2014/0056207 A1* | 2/2014 | Shin .................... | H04B 7/0615 | |
| | | | 370/312 | |
| 2014/0146756 A1 | 5/2014 | Sahin et al. | | |
| 2018/0329711 A1* | 11/2018 | Ghiya .................... | G06F 9/384 | |
| 2019/0081776 A1* | 3/2019 | Satou .................... | H04L 9/0841 | |
| 2020/0177501 A1* | 6/2020 | Zhang .................... | H04W 76/11 | |
| 2021/0376966 A1 | 12/2021 | Sengupta et al. | | |
| 2022/0400475 A1* | 12/2022 | Suh .................... | H04W 72/23 | |
| 2023/0047407 A1 | 2/2023 | Li et al. | | |
| 2024/0022368 A1* | 1/2024 | Khoshnevisan ...... | H04L 5/0048 | |
| 2024/0072884 A1* | 2/2024 | Bhaskar ............... | H04W 52/18 | |

FOREIGN PATENT DOCUMENTS

WO　　WO-2021218742 A1　　11/2021

OTHER PUBLICATIONS

International Search Report and Written Opinion—PCT/US2023/077797—ISA/EPO—Feb. 6, 2024.

* cited by examiner

*Primary Examiner* — Brian D Nguyen

(74) *Attorney, Agent, or Firm* — Holland & Hart LLP

(57)　　　　ABSTRACT

Methods, systems, and devices for wireless communications are described. Techniques described herein provide for priority and feedback resources for rate-split transmissions. In rate-splitting approaches, messages destined for various user equipment (UEs) may be split into a common portion and a private portion. The common portion of messages may be transmitted to multiple UEs, and each of the private portions may be transmitted to individual UEs, so that each UE may receive their entire respective messages. The network may assign different feedback resources for the common portion and the private portion of a rate-split transmission. The feedback resource for the common portion may be prior to the feedback resource for the private portion.

27 Claims, 20 Drawing Sheets

FIG. 2

Slot 505

RBs

OFDM Symbols

500

105-c 115-d

705 — SSB, SIB, RS, RRC signaling

710 — DL syn, SI decoding and measurement

715 — msgA preamble (PRACH)

720 — msgA payload (PUSCH)

725 — msgA preamble and payload processing

730 — msgB PDCCH

735 — msgB PDSCH

740 — PUCCH (HARQ ACK/NACK)

700

105-d 115-e

Control signaling indicating a first communication resource for feedback associated with a common portion of a transmission and a second communication resource for feedback associated with a private portion of the transmission

805

Common portion and private portion

805

Feedback message for common portion

815

800

130

105

115

Network
Entity

Transceiver

1610

Antenna

1615

Communications
Manager

1620

Memory

Code

1630

1625

1640

Processor

1635

1605

1600

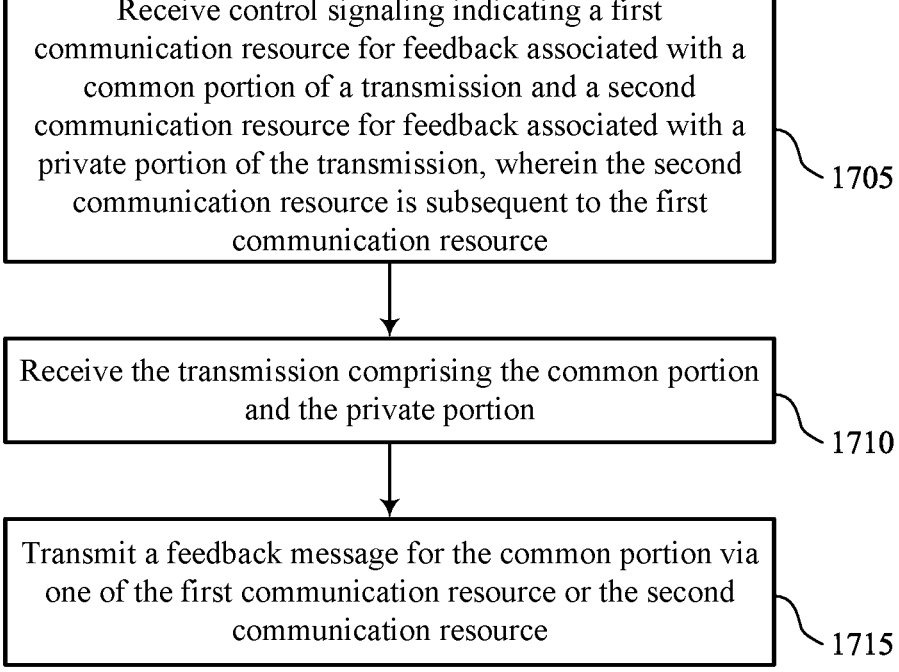

Receive control signaling indicating a first communication resource for feedback associated with a common portion of a transmission and a second communication resource for feedback associated with a private portion of the transmission, wherein the second communication resource is subsequent to the first communication resource

1705

Receive the transmission comprising the common portion and the private portion

1710

Transmit a feedback message for the common portion via one of the first communication resource or the second communication resource

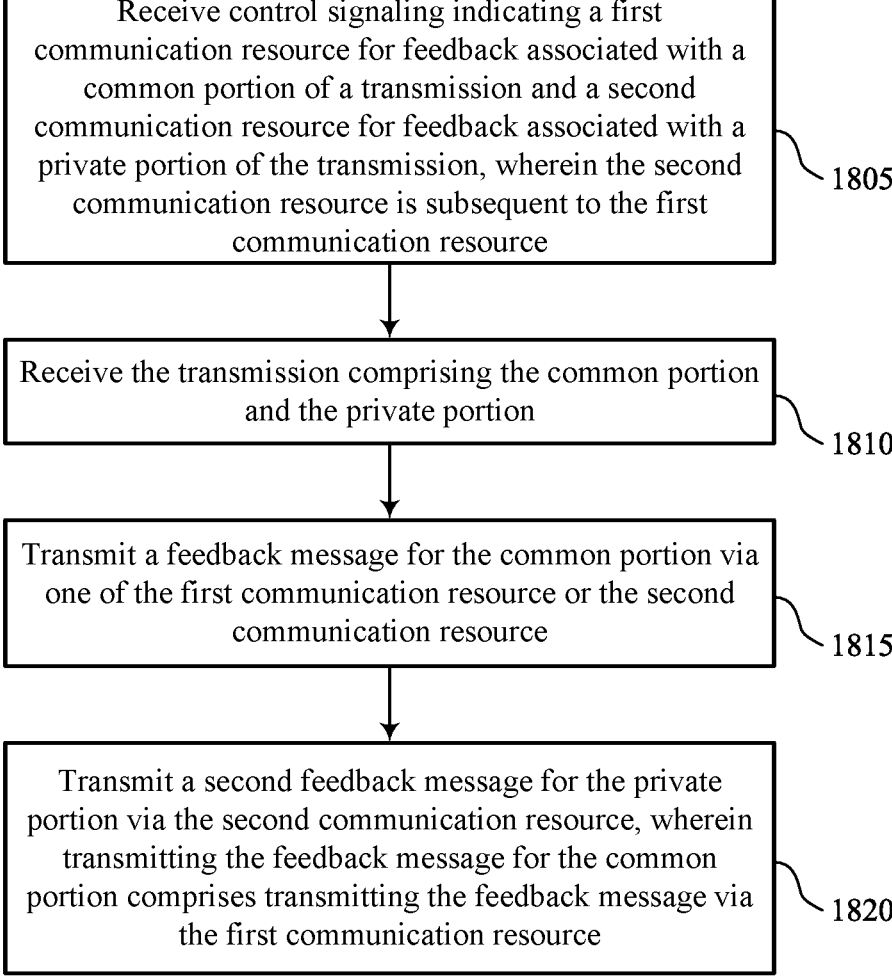

Receive control signaling indicating a first communication resource for feedback associated with a common portion of a transmission and a second communication resource for feedback associated with a private portion of the transmission, wherein the second communication resource is subsequent to the first communication resource

1805

Receive the transmission comprising the common portion and the private portion

1810

Transmit a feedback message for the common portion via one of the first communication resource or the second communication resource

1815

Transmit a second feedback message for the private portion via the second communication resource, wherein transmitting the feedback message for the common portion comprises transmitting the feedback message via the first communication resource

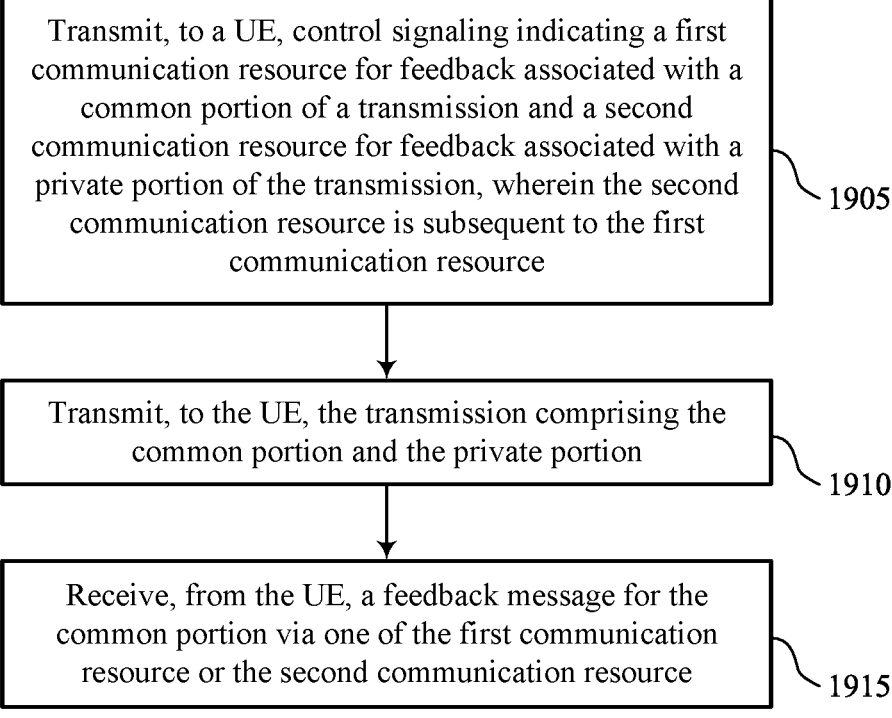

Transmit, to a UE, control signaling indicating a first communication resource for feedback associated with a common portion of a transmission and a second communication resource for feedback associated with a private portion of the transmission, wherein the second communication resource is subsequent to the first communication resource

1905

Transmit, to the UE, the transmission comprising the common portion and the private portion

1910

Receive, from the UE, a feedback message for the common portion via one of the first communication resource or the second communication resource

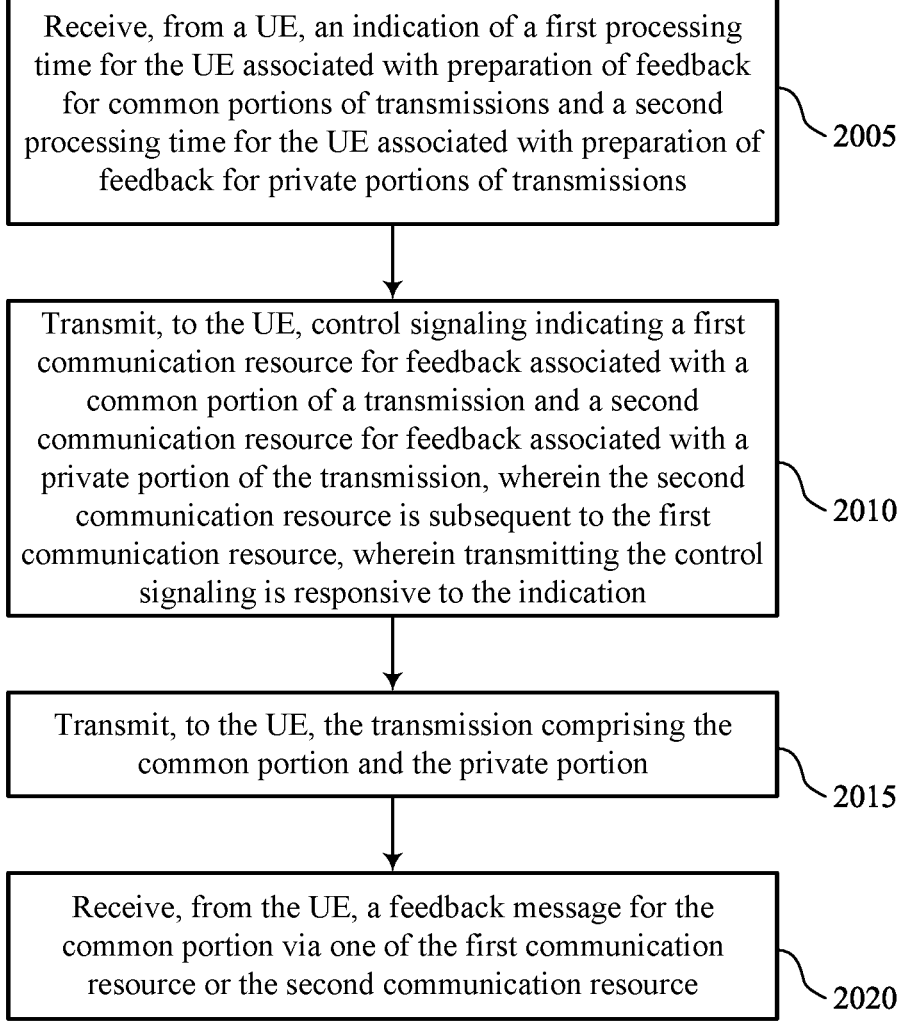

Receive, from a UE, an indication of a first processing time for the UE associated with preparation of feedback for common portions of transmissions and a second processing time for the UE associated with preparation of feedback for private portions of transmissions

2005

Transmit, to the UE, control signaling indicating a first communication resource for feedback associated with a common portion of a transmission and a second communication resource for feedback associated with a private portion of the transmission, wherein the second communication resource is subsequent to the first communication resource, wherein transmitting the control signaling is responsive to the indication

2010

Transmit, to the UE, the transmission comprising the common portion and the private portion

2015

Receive, from the UE, a feedback message for the common portion via one of the first communication resource or the second communication resource

PRIORITY AND FEEDBACK FOR RATE SPLIT SCHEMES

TECHNICAL FIELD

The following relates to wireless communications, including priority and feedback for rate-split schemes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support priority and feedback for rate-split schemes. For example, the described techniques provide feedback resources for rate-split transmissions. As another example, described techniques provide for rate-splitting in initial access messages. In rate-splitting techniques, messages destined for user equipment (UE)s may be split into a common portion and a private portion. The common portion of the messages may be combined in a single common codeword (CW) and transmitted to multiple UEs, and each of the private portions may be maintained separate in respective private CWs and transmitted to individual UEs, so that each UE may receive their entire respective messages. The network may assign different feedback resources for the common portion and the private portion of a rate-split transmission. The feedback resource for the common portion may be prior to the feedback resource for the private portion.

A method for wireless communications at a UE is described. The method may include receiving control signaling indicating a first communication resource for feedback associated with a common portion of a transmission and a second communication resource for feedback associated with a private portion of the transmission, where the second communication resource is subsequent to the first communication resource, receiving the transmission including the common portion and the private portion, and transmitting a feedback message for the common portion via one of the first communication resource or the second communication resource.

An apparatus for wireless communications at a UE is described. The apparatus may include at least one processor, and memory coupled with the at least one processor. The memory may store instructions executable by the at least one processor (e.g., directly, indirectly, after pre-processing, or without pre-processing) to cause the apparatus to receive control signaling indicating a first communication resource for feedback associated with a common portion of a transmission and a second communication resource for feedback associated with a private portion of the transmission, where the second communication resource is subsequent to the first communication resource, receive the transmission including the common portion and the private portion, and transmit a feedback message for the common portion via one of the first communication resource or the second communication resource.

Another apparatus for wireless communications at a UE is described. The apparatus may include means for receiving control signaling indicating a first communication resource for feedback associated with a common portion of a transmission and a second communication resource for feedback associated with a private portion of the transmission, where the second communication resource is subsequent to the first communication resource, means for receiving the transmission including the common portion and the private portion, and means for transmitting a feedback message for the common portion via one of the first communication resource or the second communication resource.

A non-transitory computer-readable medium storing code for wireless communications at a UE is described. The code may include instructions executable by at least one processor to receive control signaling indicating a first communication resource for feedback associated with a common portion of a transmission and a second communication resource for feedback associated with a private portion of the transmission, where the second communication resource is subsequent to the first communication resource, receive the transmission including the common portion and the private portion, and transmit a feedback message for the common portion via one of the first communication resource or the second communication resource.

Some examples of the method, apparatuses, and non-transitory computer-readable medium described herein may further include operations, features, means, or instructions for transmitting an indication of a first processing time for the UE associated with preparation of feedback for common portions of transmissions and a second processing time for the UE associated with preparation of feedback for private portions of transmissions, where receiving the control signaling may be responsive to the indication.

Some examples of the method, apparatuses, and non-transitory computer-readable medium described herein may further include operations, features, means, or instructions for transmitting a second feedback message for the private portion via the second communication resource, where transmitting the feedback message for the common portion includes transmitting the feedback message via the first communication resource.

Some examples of the method, apparatuses, and non-transitory computer-readable medium described herein may further include operations, features, means, or instructions for cancelling a transmission of a second feedback message for the private portion via the second communication resource based on transmitting the feedback message for the common portion including transmitting a negative acknowledgment for the common portion via the first communication resource.

Some examples of the method, apparatuses, and non-transitory computer-readable medium described herein may further include operations, features, means, or instructions for determining that the first communication resource may be unavailable for transmission of the feedback message, where transmitting the feedback message for the common portion includes transmitting the feedback message via the second communication resource and cancelling a transmission of a second feedback message for the private portion via the second communication resource.

Some examples of the method, apparatuses, and non-transitory computer-readable medium described herein may further include operations, features, means, or instructions for determining that the first communication resource may be unavailable for transmission of the feedback message, where transmitting the feedback message for the common portion includes multiplexing the feedback message with a second feedback message for the private portion in a same transmission via the second communication resource.

In some examples of the method, apparatuses, and non-transitory computer-readable medium described herein, multiplexing the feedback message with the second feedback message may include operations, features, means, or instructions for transmitting the feedback message via a first subset of communication resources of the second communication resource and transmitting the second feedback message via a second subset of communication resources of the second communication resource.

In some examples of the method, apparatuses, and non-transitory computer-readable medium described herein, multiplexing the feedback message with the second feedback message may include operations, features, means, or instructions for encoding the feedback message and the second feedback message in a same CW using one of a polar encoder or a single cyclic shift.

In some examples of the method, apparatuses, and non-transitory computer-readable medium described herein, the first communication resource includes a first set of symbols of a slot, and the second communication resource includes a second set of symbols of the slot.

Some examples of the method, apparatuses, and non-transitory computer-readable medium described herein may further include operations, features, means, or instructions for cancelling a transmission of the uplink control message via the first communication resource, where the feedback message is transmitted via the first communication resource based on the feedback message having a higher priority level than the uplink control message scheduled for transmission via the first communication resource.

Some examples of the method, apparatuses, and non-transitory computer-readable medium described herein may further include operations, features, means, or instructions for determining that an uplink control message may be scheduled for transmission via the second communication resource, transmitting the uplink control message via the second communication resource based on the uplink control message having a higher priority level than a second feedback message for the private portion, and cancelling a transmission of the second feedback message for the private portion via the second communication resource.

Some examples of the method, apparatuses, and non-transitory computer-readable medium described herein may further include operations, features, means, or instructions for receiving second control signaling indicating a timing offset between communications resources for feedback for common portions of transmissions and communications resources for feedback for private portions of transmissions, and where receiving the control signaling includes receiving an indication of a starting time for the first communication resource.

In some examples of the method, apparatuses, and non-transitory computer-readable medium described herein, receiving the control signaling may include operations, features, means, or instructions for receiving a downlink control information scheduling the transmission.

Some examples of the method, apparatuses, and non-transitory computer-readable medium described herein may further include operations, features, means, or instructions for receiving second control signaling indicating that a random access channel (RACH) message may be rate-split, where the transmission includes the RACH message.

A method for wireless communications at a network entity is described. The method may include transmitting, to a UE, control signaling indicating a first communication resource for feedback associated with a common portion of a transmission and a second communication resource for feedback associated with a private portion of the transmission, where the second communication resource is subsequent to the first communication resource, transmitting, to the UE, the transmission including the common portion and the private portion, and receiving, from the UE, a feedback message for the common portion via one of the first communication resource or the second communication resource.

An apparatus for wireless communications at a network entity is described. The apparatus may include at least one processor, and memory coupled with the at least one processor. The memory may store instructions executable by the at least one processor to cause the apparatus to transmit, to a UE, control signaling indicating a first communication resource for feedback associated with a common portion of a transmission and a second communication resource for feedback associated with a private portion of the transmission, where the second communication resource is subsequent to the first communication resource, transmit, to the UE, the transmission including the common portion and the private portion, and receive, from the UE, a feedback message for the common portion via one of the first communication resource or the second communication resource.

Another apparatus for wireless communications at a network entity is described. The apparatus may include means for transmitting, to a UE, control signaling indicating a first communication resource for feedback associated with a common portion of a transmission and a second communication resource for feedback associated with a private portion of the transmission, where the second communication resource is subsequent to the first communication resource, means for transmitting, to the UE, the transmission including the common portion and the private portion, and means for receiving, from the UE, a feedback message for the common portion via one of the first communication resource or the second communication resource.

A non-transitory computer-readable medium storing code for wireless communications at a network entity is described. The code may include instructions executable by at least one processor to transmit, to a UE, control signaling indicating a first communication resource for feedback associated with a common portion of a transmission and a second communication resource for feedback associated with a private portion of the transmission, where the second communication resource is subsequent to the first communication resource, transmit, to the UE, the transmission including the common portion and the private portion, and receive, from the UE, a feedback message for the common portion via one of the first communication resource or the second communication resource.

Some examples of the method, apparatuses, and non-transitory computer-readable medium described herein may further include operations, features, means, or instructions for receiving, from the UE, an indication of a first processing time for the UE associated with preparation of feedback for common portions of transmissions and a second processing time for the UE associated with preparation of feedback for private portions of transmissions, where transmitting the control signaling may be responsive to the indication.

Some examples of the method, apparatuses, and non-transitory computer-readable medium described herein may further include operations, features, means, or instructions for receiving a second feedback message for the private portion via the second communication resource, where receiving the feedback message for the common portion includes receiving the feedback message via the first communication resource.

In some examples of the method, apparatuses, and non-transitory computer-readable medium described herein, receiving the feedback message for the common portion may include operations, features, means, or instructions for receiving the feedback message via the second communication resource, and where a second feedback message for the private portion may be not received via the second communication resource.

In some examples of the method, apparatuses, and non-transitory computer-readable medium described herein, receiving the feedback message for the common portion may include operations, features, means, or instructions for receiving the feedback message multiplexed with a second feedback message for the private portion in a same transmission via the second communication resource.

In some examples of the method, apparatuses, and non-transitory computer-readable medium described herein, receiving the feedback message multiplexed with the second feedback message for the private portion may include operations, features, means, or instructions for receiving the feedback message via a first subset of communication resources of the second communication resource and receiving the second feedback message via a second subset of communication resources of the second communication resource.

In some examples of the method, apparatuses, and non-transitory computer-readable medium described herein, receiving the feedback message multiplexed with the second feedback message for the private portion may include operations, features, means, or instructions for decoding the feedback message and the second feedback message in a same CW using one of a polar encoder or a single cyclic shift.

In some examples of the method, apparatuses, and non-transitory computer-readable medium described herein, the first communication resource includes a first set of symbols of a slot, and the second communication resource includes a second set of symbols of the slot.

In some examples of the method, apparatuses, and non-transitory computer-readable medium described herein, the feedback message may be received via the first communication resource based on the feedback message having a higher priority level than an uplink control message scheduled for transmission via the first communication resource.

Some examples of the method, apparatuses, and non-transitory computer-readable medium described herein may further include operations, features, means, or instructions for receiving an uplink control message via the second communication resource based on the uplink control message having a higher priority level than a second feedback message for the private portion.

Some examples of the method, apparatuses, and non-transitory computer-readable medium described herein may further include operations, features, means, or instructions for transmitting second control signaling indicating a timing offset between communications resources for feedback for common portions of transmissions and communications resources for feedback for private portions of transmissions, and where transmitting the control signaling includes transmitting an indication of a starting time for the first communication resource.

In some examples of the method, apparatuses, and non-transitory computer-readable medium described herein, receiving the control signaling may include operations, features, means, or instructions for transmitting a downlink control information scheduling the transmission.

Some examples of the method, apparatuses, and non-transitory computer-readable medium described herein may further include operations, features, means, or instructions for transmitting second control signaling indicating that a RACH message may be rate-split, where the transmission includes the RACH message.

BRIEF DESCRIPTION OF THE DRAWINGS

FIG. 2 illustrates an example of a wireless communications system that supports priority and feedback for rate-split schemes in accordance with one or more aspects of the present disclosure.

FIGS. 17 through 20 show flowcharts illustrating methods that support priority and feedback for rate-split schemes in accordance with one or more aspects of the present disclosure.

DETAILED DESCRIPTION

Figure 1:
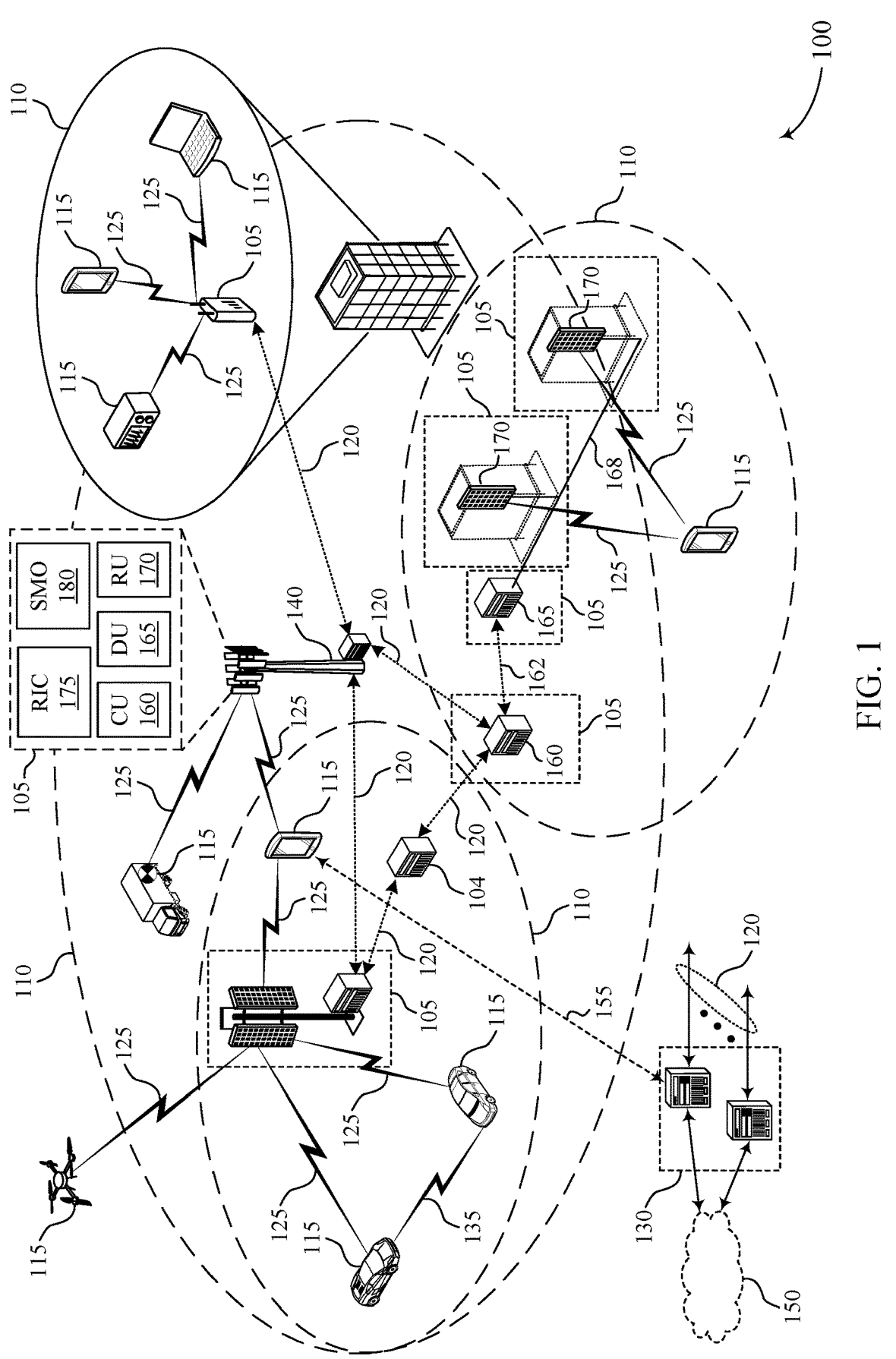
FIG. 1 illustrates an example of a wireless communications system that supports priority and feedback for rate-split schemes in accordance with one or more aspects of the present disclosure.

In some wireless communications systems, rate-splitting techniques may be used to improve characteristics of broadcast channels, including degrees of freedom and capacity of wireless channels. In such approaches, messages destined for various user equipment (UEs) may be split into "common" portions and "private" portions. The common portions of messages for the various UEs may be combined in a single common codeword (CW), and each of the private portions may be maintained separate in respective private CWs (e.g., on a per-UE basis). The common CW may be transmitted to multiple UEs and each private CW may respectively be transmitted to individual UEs, so that each UE may receive that UE's entire respective message as a combination of the common CW and the private CW. To decode the private portion, the UE may first decode the common portion. A time period for a UE to process a downlink message received via a physical downlink shared channel (PDSCH) before transmitting feedback may be referred to as a PDSCH processing time. The UE may transmit feedback starting in a first symbol that is at least the PDSCH processing time after a final symbol of the PDSCH. In rate-splitting, as decoding the private portion of a transmission may depend on decoding the common portion of the transmission, the PDSCH processing time for a common portion of a transmission may be less than the PDSCH processing time for a private portion of a transmission.

In some examples, a network entity may assign different hybrid automatic repeat request (HARQ) acknowledgment (ACK) resources for the common portion and the private portion of a rate-split transmission. In some examples, the HARQ-ACK resource for the common portion may be prior to the HARQ-ACK resource for the private portion. In some examples, the UE may report a PDSCH processing time for a common portion and the PDSCH processing time for a private portion, and the network entity may configure the HARQ-ACK resources for the common and private portions based on the reported PDSCH processing times. In some examples, the network may assign a higher priority to HARQ-ACK for common portions than HARQ-ACK for private portions, as a private portion may not be decoded unless the common portion is decoded. For example, if the first resource for HARQ-ACK for the common portion is missed or dropped (e.g., due to a scheduling conflict with another physical uplink control channel (PUCCH) transmission), the UE may transmit the HARQ-ACK for the common portion on the HARQ-ACK resource for the private portion. In some examples, the UE may drop the HARQ-ACK for the private portion. In some examples, the UE may multiplex the HARQ-ACK for the common portion and the private portion.

In some examples, rate-splitting may be used in initial access messages (e.g., random access channel (RACH) messages). The network entity may indicate in control signaling (e.g., a master information block (MIB) or a system information block (SIB)), or in one of the RACH messages, which subsequent RACH messages will be transmitted using a rate-splitting scheme. The control signaling may indicate a quantity of layers and a modulation and coding scheme (MCS) associated with each rate-split message. The UE may accordingly decode the indicated rate-split RACH messages.

Aspects of the disclosure are initially described in the context of wireless communications systems. Aspects of the disclosure are further illustrated with reference resource diagrams, slot formats, and process flows. Aspects of the disclosure are further illustrated by and described with reference to apparatus diagrams, system diagrams, and flow-charts that relate to priority and feedback for rate-split schemes.

FIG. 1 illustrates an example of a wireless communications system 100 that supports priority and feedback for rate-split schemes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140). Components within a wireless communication system may be coupled (for example, operatively, communicatively, functionally, electronically, and/or electrically) to each other.

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support priority and feedback for rate-split schemes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer a netbook, a smartbook, a personal computer, a smart device, a wearable device (e.g., a smart watch, a smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IOT (also referred to as CAT NB1) UEs, as well as other types of UEs. eMTC and NB-IOT may refer to future technologies that may evolve from or may be based on these technologies. For example, eMTC may include FeMTC (further eMTC), eFeMTC (enhanced further eMTC), and mMTC (massive MTC), and NB-IOT may include eNB-IoT (enhanced NB-IOT), and FeNB-IOT (further enhanced NB-IOT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same CW) or different data streams (e.g., different CWs). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may implement rate-splitting techniques to improve characteristics of broadcast channels, including degrees of freedom and capacity of wireless channels. For example, messages for various UEs 115 may be split into "common" portions and "private" portions. The common portions of messages for the various UEs 115 may be combined in a single common CW, and each of the private portions may be maintained separate in respective private CWs (e.g., on a per-UE basis). The common CW may be transmitted to multiple UEs 115 and each private CW may respectively be transmitted to individual UEs 115, so that each UE 115 may receive their entire respective messages. To decode the private portion, the UE 115 may first decode the common portion. In rate-splitting, as decoding the private portion may depend on decoding the common portion, the PDSCH processing time for a common portion may be less than the PDSCH processing time for a private portion.

In some examples, a network entity 105 may assign different HARQ-ACK resources for the common portion and the private portion of a rate-split transmission. The HARQ-ACK resource for the common portion may be prior to the HARQ-ACK resource for the private portion. In some examples, the UE 115 may report a PDSCH processing time for a common portion and the PDSCH processing time for a private portion, and the network entity 105 may configure the HARQ-ACK resources for the common and private portions based on the reported PDSCH processing times. In some examples, because decoding the private portion is dependent on successfully decoding the common portion, the network entity 105 may assign a higher priority to HARQ-ACK for common portions than HARQ-ACK for private portions. For example, if the first resource for HARQ-ACK for the common portion is missed or dropped (e.g., due to a scheduling conflict with another PUCCH transmission), the UE 115 may transmit the HARQ-ACK for the common portion on the HARQ-ACK resource for the private portion. In some examples, the UE 115 may drop the HARQ-ACK for the private portion. In some examples, the UE 115 may multiplex the HARQ-ACK for the common portion and the private portion.

In some examples, rate-splitting may be used in initial access messages (e.g., RACH messages). The network entity

105 may indicate in control signaling (e.g., a MIB or a SIB), or in one of the RACH messages, which subsequent RACH messages will be transmitted using a rate-splitting scheme. The control signaling may indicate a quantity of layers and an MCS associated with each rate-split message. The UE 115 may accordingly decode the indicated rate-split RACH messages.

Figure 2:
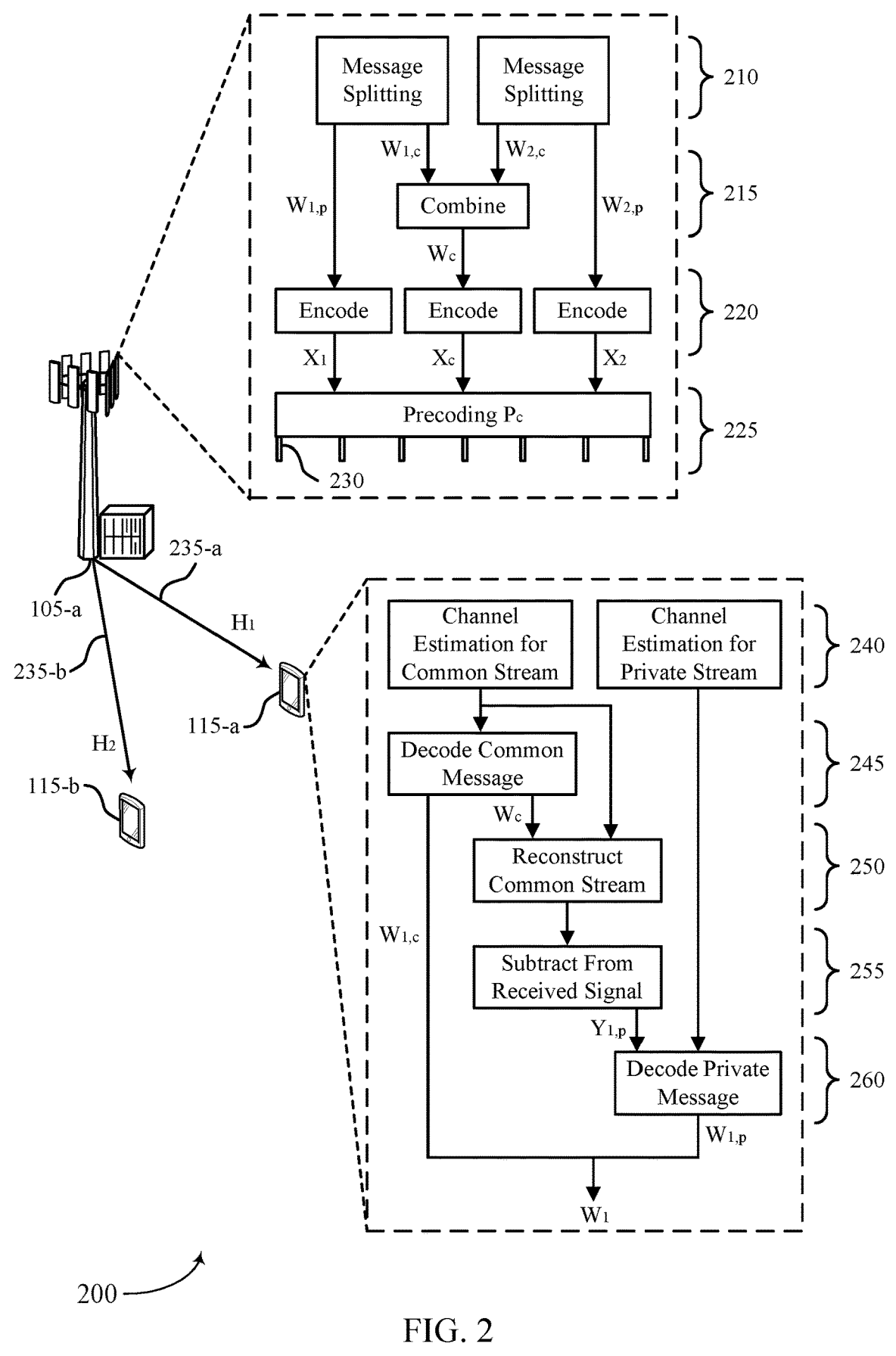

FIG. 2 illustrates an example of a wireless communications system 200 that supports priority and feedback for rate-split schemes in accordance with one or more aspects of the present disclosure. The wireless communications system 200 includes a network entity 105-a, which may be an example of a network entity 105 as described herein with reference to FIG. 1. The network entity 105-a may communicate with a UE 115-a and a UE 115-b, which may be examples of a UE 115 as described herein with reference to FIG. 1.

The network entity 105-a may communicate with the UE 115-a and the UE 115-b using rate-splitting techniques. For example, the network entity 105-a may determine a first message intended for transmission to the UE 115-a and a second message intended for transmission to the UE 115-b. The network entity 105-a may split messages to the UE 115-a and to the UE 115-b into a common portion to be decoded by both the UE 115-a and the UE 115-b and private portions unique to each of the UE 115-a and the UE 115-b, respectively. In some examples, the network entity 105-a may use the rate-splitting techniques for a broadcast channel, for example, to achieve a relatively high degree of freedom for transmissions, a relatively high capacity for transmissions, to gain other advantages, or any combination. In some cases, the common portion of individual messages of two or more UEs 115 may be combined, for example concatenated, into a common portion, $W_c$, encoded and modulated to obtain, $X_c$, which may be referred to as a common stream, and may have one or more layers.

For example, the network entity 105-a may perform message splitting at 210, for the UE 115-a and the UE 115-b. The network entity 105-a may split a first message intended for transmission to the UE 115-a into a common portion, $W_{1,c}$, and a private portion, $W_{1,p}$. Similarly, the network entity 105-a may split a second message intended for transmission to the UE 115-b into a common portion $W_{2,c}$, and a private portion, $W_{2,p}$.

At 215, the network entity 105-a may combine the common portion of the first message, $W_{1,c}$, with the common portion of the second message, $W_{2,c}$, to obtain a combined common portion, $W_c$. At 220, the network entity 105-a may encode the combined common portion, $W_c$, the private portion of the first message, $W_{1,p}$, and the private portion of the second message, $W_{2,p}$, to obtain a common stream, $X_c$, a private stream for the UE 115-a, $X_1$, and a private stream for the UE 115-b, $X_2$, respectively.

At 225, the network entity 105-a may precode the common stream, $X_c$. In some examples, the network entity 105-a may precode $X_c$ using a precoder, $P_c$, and the network entity 105-a may determine $P_c$ based on preconfigured values or otherwise defined values. The network entity 105-a may transmit the precoded common stream using one or more transmit antennas 230.

The network entity 105-a may encode and modulate the private portion of individual messages from the UE 115-a and the UE 115-b (e.g., $W_{1,p}$ and $W_{2,p}$) separately to obtain private streams for the corresponding UEs (e.g., $X_1$ and $X_2$). The private streams may be precoded according to different precoders, such as $P_1$ and $P_2$, respectively. Accordingly, the output of the precoding, X, may be given as $X=P_cX_c+P_1X_1+$ $P_2X_2$. The network entity 105-*a* may transmit the private streams using different transmit antennas 230 than the common stream. In some examples, the encoding at 220, may include modulation and mapping to one or more layers in addition to encoding.

The network entity 105-*a* may transmit the precoded transmission, $H_1$, to the UE 115-*a*, which may include the common stream $X_c$, the private stream $X_1$, or both. Similarly, the network entity 105-*a* may transmit the precoded transmission, $H_2$, to the UE 115-*b*, which may include the common stream $X_c$, the private stream $X_2$, or both. The UE 115-*a* may receive a signal $Y_1$, where $Y_1 = H_1 P_c X_c + H_1 P_1 X_1 + H_1 P_2 X_2 + N_1$. The network entity 105-*a* may transmit the common stream and the private streams via transmissions of one or more common transport blocks, private transport blocks, common code blocks, private code blocks, or any combination thereof. For example, the network entity 105-*a* may transmit the precoded transmission, $H_1$, to the UE 115-*a* via communication link 235-*a*, and may transmit the precoded transmission, $H_2$, to the UE 115-*b* via communication link 235-*b*. The communication link 235-*a* and the communication link 235-*b* may be examples of communication links 125 as described herein with reference to FIG. 1, among other examples.

The UE 115-*a* and the UE 115-*b* may receive the one or more common transport blocks, private transport blocks, common code blocks, private code blocks, or combination thereof. In some cases, at the receiver side, each UE 115 may decode the common portion prior to the private portion, for example, using successive decoding. In some cases, at the receiver side, each UE 115 may decode a respective private portion prior to the common. In some examples, at 240, the UE 115-*a* may perform channel estimation for the common stream $X_c$ and for the private stream $X_{1,p}$. For example, the UE 115-*a* may estimate an effective channel corresponding to the common stream (e.g., $H_1 P_c$). At 245, the UE 115-*a* may decode the common stream $X_c$ to obtain the common portion (e.g., $W_c$), which may include demodulation and de-mapping procedures. The common portion may include a message of the individual message for each UE 115 (e.g., $W_{1,c}$ and $W_{2,c}$) embedded in the common portion, including data intended for the individual UE 115-*a*.

At 250, to obtain the private portion, the UE 115-*a* may re-encode the common stream (e.g., $X_c$) and may adapt based on (e.g., may multiply) by the estimated effective channel (e.g., $H_1 P_c$). At 255, the UE 115-*a* may adapt the result (e.g., may subtract the result) from a received signal, $Y_1$, which may result in an effective channel for the private portion, $Y_{1,p}$. That is, the UE 115-*a* may perform a cancelation according to Equation 1:

$$Y_{1,p} = Y_1 - H_1 P_c X_c = H_1 P_1 X_1 + H_1 P_2 X_2 + N_1 \qquad (1)$$

where $N_1$ is an interference value, and Equation 1 is based on a correct channel estimation and successful decoding.

At 260, the UE 115-*a* may use $Y_{1,p}$ to decode the private portion, $W_{1,p}$. Decoding at 245 and at 260 may also include demodulation and demapping in addition to decoding. Accordingly, the UE 115-*a* may obtain an overall message, $W_1$, based on the common portion (e.g., $W_{1,c}$) and the private portion (e.g., $W_{1,p}$). The UE 115-*b* may follow a similar process for obtaining a common portion (e.g., $W_{2,c}$) and a private portion (e.g., $W_{2,p}$), which the UE 115-*b* may use to obtain an overall message, $W_2$.

Figure 3:
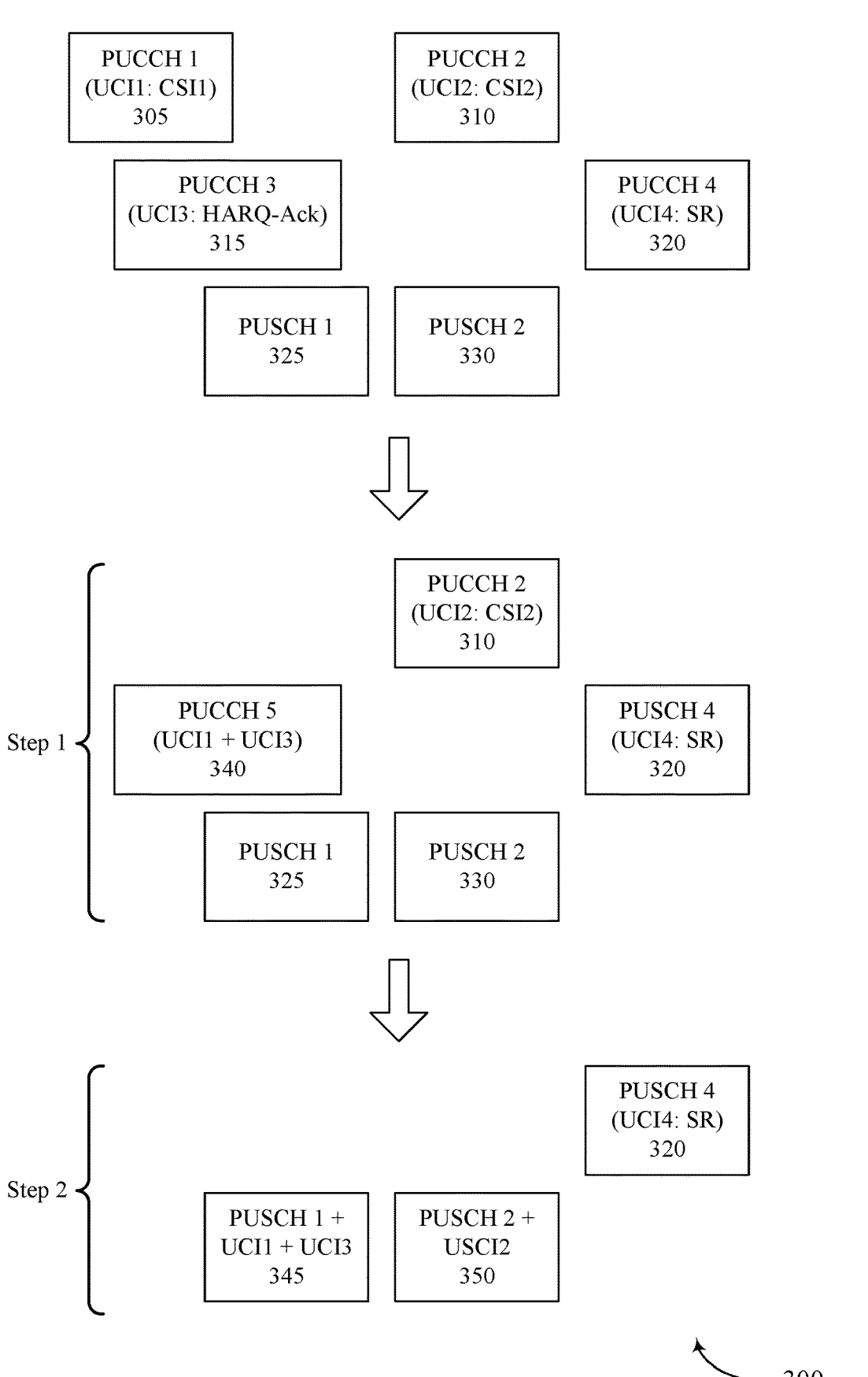
FIG. 3 illustrates an example of a resource diagram that supports priority and feedback for rate-split schemes in accordance with one or more aspects of the present disclosure.

FIG. 3 illustrates an example of a resource diagram 300 that supports priority and feedback for rate-split schemes in accordance with one or more aspects of the present disclosure. The resource diagram 300 may implement aspects of the wireless communications system 100 or the wireless communications system 200.

The resource diagram 300 illustrates an example of an uplink control information (UCI) multiplexing and prioritization technique. In some examples, when a PUCCH resource, including UCI of a HARQ-ACK, channel state information (CSI) or a scheduling request (SR), overlaps with a physical uplink shared channel (PUSCH) resource, the UE 115 may multiplex the UCI on the PUSCH.

For example, the resource diagram 300 illustrates a first PUCCH 305 including UCI 1 of CSI1 overlapping a third PUCCH 315 including UCI3 of HARQ-ACK. A second PUCCH 310 including UCI2 of CSI-2 does not overlap the first PUCCH 305 or the third PUCCH 315. A fourth PUCCH 320 including UCI4 of SR does not overlap the first PUCCH 305, the second PUCCH 310 or the third PUCCH 315. A first PUSCH 325 overlaps with the first PUCCH 305 and the third PUCCH 315. A second PUSCH 330 overlaps with the second PUCCH 310.

In some examples, at step 1, the UE 115 first may resolve the overlap of different PUCCH resources (the first PUCCH 305 and the third PUCCH 315) by multiplexing the UCI1 and UCI3 at a fifth PUCCH 340 including UCI1 and UCI3 of HARQ-ACK and CSI1. The result of step 1 provides non-overlapping PUCCH resources of the second PUCCH 310, the fourth PUCCH 320 and the fifth PUCCH 340 with UCIs (HARQ-ACK, CSI and SR).

In some examples, at step 2, the UE 115 may resolve the overlapping PUSCH and PUCCH. For example, the UE 115 may resolve the overlap of the fifth PUCCH 340 and the first PUSCH 325 by multiplexing the UCI1 and UCI3 on the first PUSCH 325 forming the first PUSCH+UCI1+UCI3 345. The UE 115 may transmit the first PUSCH+UCI1+UCI3 345 and may not transmit the fifth PUCCH 340. Similarly, the UE 115 may resolve the overlap of the second PUSCH 330 and the second PUCCH 310 by multiplexing the UCI2 on the second PUCCH 310, forming the second PUSCH+UCI2 350. The UE 115 may transmit the second PUSCH+UCI2 350 and may not transmit the second PUCCH 310. The UE 115 may transmit the fourth PUCCH 320 that does not overlap with any resources. In some examples, a beta offset signaled in uplink grant (downlink control information (DCI) format 0_1/0_2) or configured RRC parameter is used to control the rate matching behavior of the multiplexing of PUCCH on PUSCH, (e.g., quantity of resources that UCI payload can occupy on PUSCH). In some examples, the overlapping PUSCH and PUCCH in step 2 may be in the same component carrier (CC) or a different CC. When a dynamically scheduled channel (scheduled by DCI) is involved, joint timelines may be satisfied for UCI multiplexing on PUCCH or PUSCH. In some examples, priority of UCI may be defined as HARQ-ACK>SR>higher priority CSI>lower priority CSI. For overlapping resources or slots, the de-prioritized UCI may be dropped without any postponing of the transmission.

In some examples, private and common streams or messages or transport blocks (TB)s may represent the same priority of a CW, and may have the same priority or quality of service (QOS) in upper layers and PHY. For a rate-splitting transmission, if the UE 115 cannot decode the common portion (e.g., a negative acknowledgment (NACK), the UE may be unable to decode the private portion. In terms of feedback priority, the HARQ-ACK of the common portion may have a higher priority than the HARQ-ACK of the private portion. In some examples, the HARQ-ACK of the common portion may have an assigned priority that is greater than the assigned priority of the HARQ-ACK of the private portion. In some examples, the CSI derived based on the common portion may have a lower priority than the CSI derived for private portion because the CSI of private portion is UE-specific and may be expected to change faster than the CSI of the common portion. In some examples, the MCS of the private portion is higher than the MCS of the common portion, so the private portion may be expected to have larger errors than the common portion. In some examples, acquiring CSI for the private portion may have higher priority, and the CSI of the private portion may not be dropped first if there is a reason to drop either the CSI of the private portion or the CSI of the common portion.

In some examples, the HARQ-ACK of the common portion may have a higher priority than the HARQ-ACK of the private portion. In some examples, the HARQ-ACK of the common portion may have the same priority as the HARQ-ACK of the private portion. In some examples, the HARQ-ACK of the common portion may be given the higher priority as an increase of the general priority of HARQ-ACK, and a sub-priority may be defined for the HARQ-ACK of the private portion.

Figure 4:
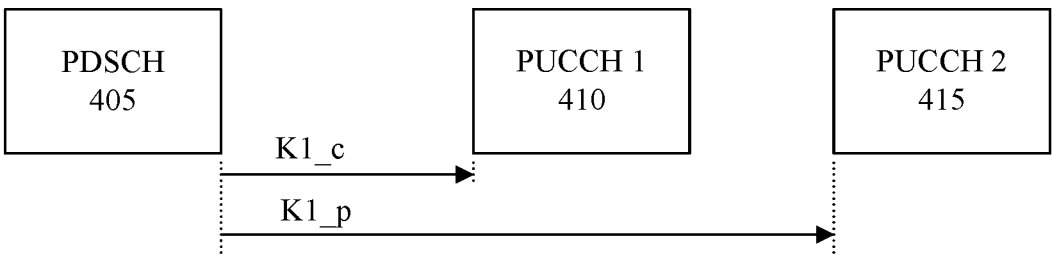
FIG. 4 illustrates an example of a resource diagram that supports priority and feedback for rate-split schemes in accordance with one or more aspects of the present disclosure.

FIG. 4 illustrates an example of a resource diagram 400 that supports priority and feedback for rate-split schemes in accordance with one or more aspects of the present disclosure. The resource diagram 400 may implement aspects of the wireless communications system 100 or the wireless communications system 200.

In some examples, the UE 115 may indicate, to the network entity 105, a processing capability of the UE 115 for preparing HARQ-ACK for the common portion of a rate-split transmission (N1_c) and a processing capability of the UE 115 for preparing HARQ-ACK for the private portion of a rate-split transmission (N1_p). In some examples, the UE 115 may report, to the network entity 105, a PDSCH processing time for the common portion and the PDSCH processing time for the private portion, and the network entity 105 may configure the HARQ-ACK resources for the common and private portions based on the reported PDSCH processing times. Based on the N1_c and N1_p values, the network entity 105 may assign an offset time for the HARQ-ACK of the common portion (K1_c) and an offset time for the HARQ-ACK of the private portion (K1_p). In some examples, the offset time K1_c and K1_p may be provided from the network entity 105 to the UE 115 in a DCI scheduling the rate-split transmission. In some examples, the network entity 105 may define an RRC or MAC control element (MAC-CE) offsets that match the delta between N1_c and N1_p.

For the example illustrated in FIG. 4, the UE 115 may process a downlink message received via a PDSCH 405. In the illustrated example, K1_c is a time period for the UE 115 to process a downlink common portion before transmitting feedback (e.g., HARQ-ACK) for the common portion to the network entity 105. K1_p is a time period for the UE 115 to process a downlink private portion before transmitting feedback (e.g., HARQ-ACK) for the private portion to the network entity 105. In some examples, the K1_c processing time for a common portion may be less than the K1_p processing time for a private portion. In one example, a first PUCCH 410 carries the HARQ-ACK of the common portion and a second PUCCH 415 carries the HARQ-ACK of the private portion to the network entity 105. The UE 115 may transmit the HARQ-ACK of the common portion starting in a first symbol that is at least the K1_c processing time after a final symbol of the PDSCH 405. The UE 115 may transmit the HARQ-ACK of the private portion starting in a first symbol that is at least the K1_p processing time after a final symbol of the PDSCH 405.

In some examples, the network entity 105 may configure two resources for HARQ-ACK of the common portion and HARQ-ACK of the private portion based on the timing capabilities indicated by the UE 115, such as the first PUCCH 410 and the second PUCCH 415. In some examples, if the HARQ-ACK of the common portion is dropped (e.g., due to a scheduling conflict with another PUCCH transmission), the UE 115 may transmit the HARQ-ACK of the common portion on the second PUCCH 415 and may drop the HARQ-ACK of the private portion. In some examples, if the HARQ-ACK of the common portion is dropped, the UE 115 may jointly transmit the HARQ-ACK of the common portion and the HARQ-ACK of the private portion on the second PUCCH 415. In some examples, the joint transmission of common portion and private portion HARQ-ACK may have separate encoding on different resources or joint encoding on the resources. In another example, for increased reliability in case the first PUCCH 410 is missed, the UE 115 may multiplex both the HARQ-ACK of the common portion and the HARQ-ACK of the private portion on the second PUCCH 415.

Figure 5:
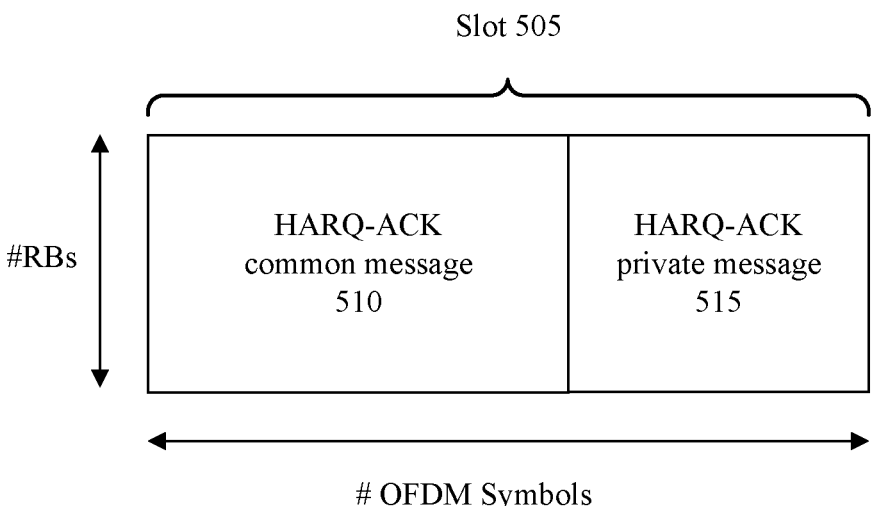
FIG. 5 illustrates an example of a slot format that supports priority and feedback for rate-split schemes in accordance with one or more aspects of the present disclosure.
Figure 5:

FIG. 5 illustrates an example of a slot format 500 that supports priority and feedback for rate-split schemes in accordance with one or more aspects of the present disclosure. The slot format 500 may implement aspects of the wireless communications system 100 or the wireless communications system 200.

In some examples, the network entity 105 may configure two resources for HARQ-ACK of the common portion of a rate-split transmission and HARQ-ACK of the private portion of a rate-split transmission on a slot 505. The slot 505 may include resources 510 for HARQ-ACK of the common portion and resources 515 for HARQ-ACK of the private portion. The network entity 105 may assign time based on the process capabilities indicated by the UE 115 (e.g., max(N1_c, N1_p) or UE reported PDSCH processing time for the common portion and PDSCH processing time for the private portion). In some examples, the resources 510 and the resource 515 may be separate (e.g., in separate symbols of the slot 505) and the two bits may be separately encoded. In some examples, the two bits may be multiplexed in raw bits and then encoded using a single CW (e.g., using a single cyclic shift in case of PUCCH 0 or using a polar encoder).

Figure 6:
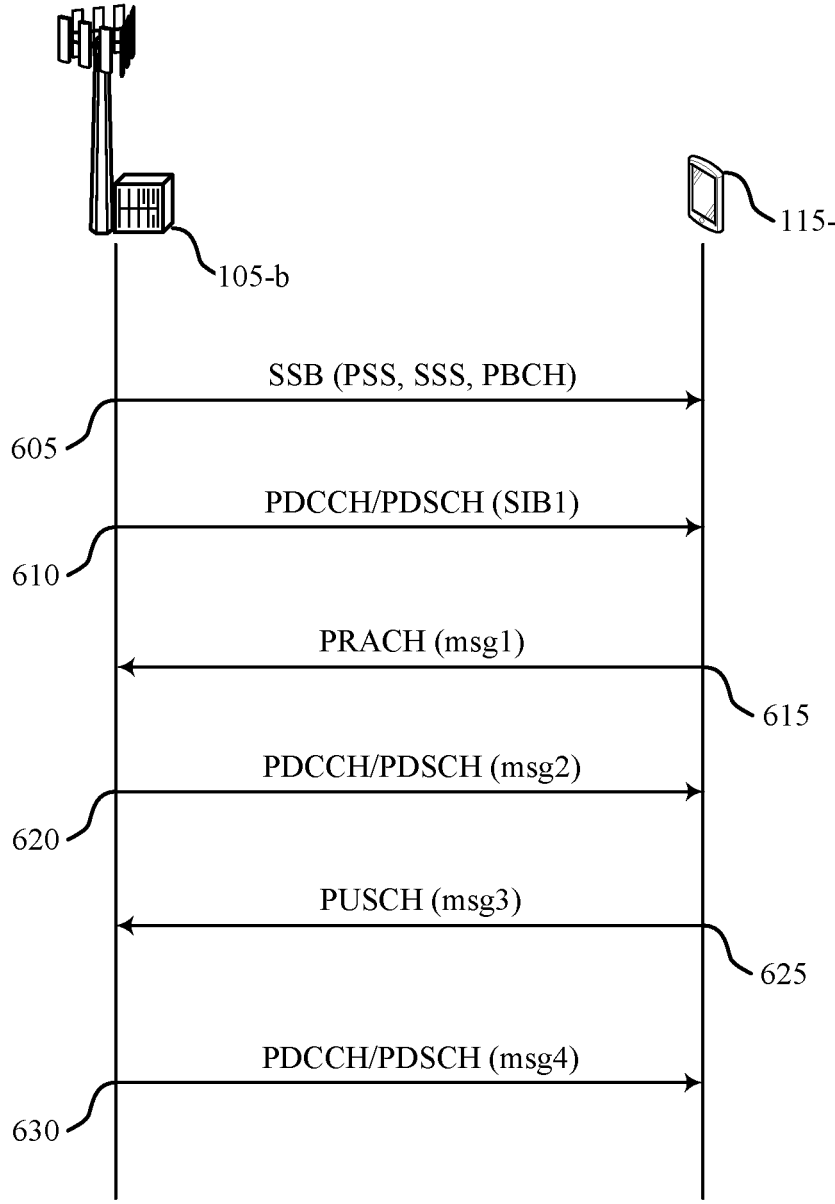
FIG. 6 illustrates an example of a process flow that supports priority and feedback for rate-split schemes in accordance with one or more aspects of the present disclosure.

FIG. 6 illustrates an example of a process flow 600 that supports priority and feedback for rate-split schemes in accordance with one or more aspects of the present disclosure. The process flow 600 may include a UE 115-c and a network entity 105-b which may be examples of the corresponding devices described herein. The process flow 600 may include aspects for a 4-step RACH procedure. The network entity 105-b and the UE 115-c may perform the 4-step RACH procedure. For example, a 4-step RACH may be used by a UE 115-c to access a cell (e.g., establish an RRC connection with a cell of the network entity 105-b). Alternative examples of the following may be implemented, where some steps may be performed in a different order than described or not performed at all. In some implementations, steps may include additional features not mentioned below, or further steps may be added.

At 605, the network entity 105-b may transmit a synchronization signal block (SSB), which may be received by the UE 115-c. The SSB may include a primary synchronization signal (PSS), a secondary synchronization signal (SSS), and/or a physical broadcast channel (PBCH). At 610, the network entity 105-*b* may transmit a SIB via a physical downlink control channel (PDCCH) or a PDSCH, which may be received by the UE 115-*c*. At 615, the UE 115-*c* may transmit a msg1 that includes a physical random access channel (PRACH) preamble via a PRACH to the network entity 105-*b*. At 620, the network entity 105-*b* may transmit a msg2 that includes a timing advance, uplink grant for msg3, and/or a temporary cell radio network temporary identifier (TC-RNTI) via a PDCCH or a PDSCH to the UE 115-*c*. At 625, the UE 115-*c* may transmit msg3 that includes a RRC connection request, scheduling request and buffer status via a PUSCH to the network entity 105-*b*. At 630, the network entity 105-*b* may transmit msg4 that includes a content resolution message via PDCCH or PDSCH to the UE 115-*c*.

Figure 7:
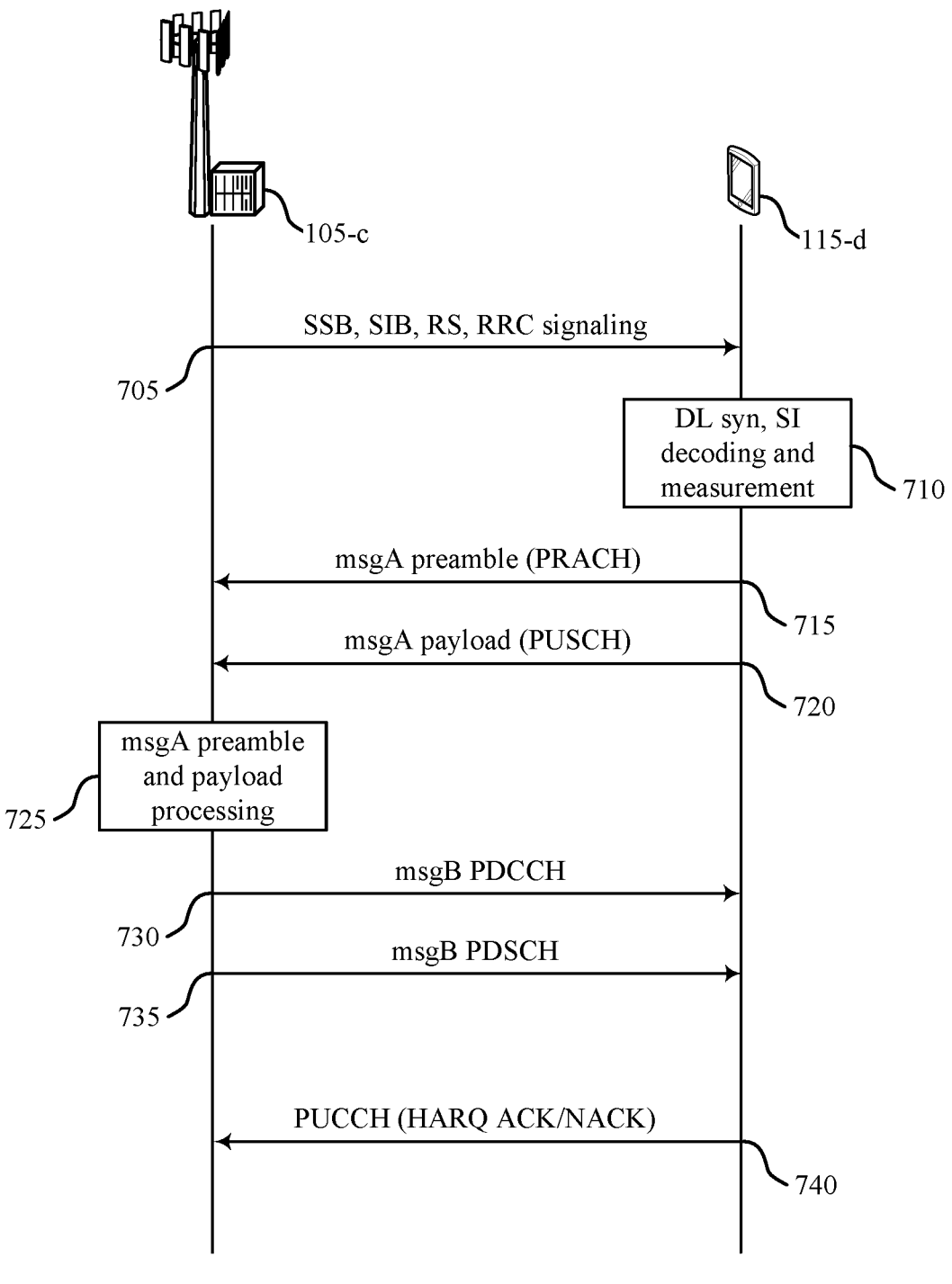
FIG. 7 illustrates an example of a process flow that supports priority and feedback for rate-split schemes in accordance with one or more aspects of the present disclosure.

FIG. 7 illustrates an example of a process flow 700 that supports priority and feedback for rate-split schemes in accordance with one or more aspects of the present disclosure. The process flow 700 may include a UE 115-*d* and a network entity 105-*c* which may be examples of the corresponding devices described herein. The process flow 700 may include aspects for a 2-step RACH procedure. The network entity 105-*c* and the UE 115-*d* may perform the 2-step RACH procedure. For example, a 2-step RACH procedure may be used by a UE 115-*d* to transition from an RRC idle or RRC inactive state to an RRC connected state, for small data transmissions while in an RRC idle or inactive state, for a handover from a source to target cell in an RRC connected mode, or while in an RRC connected mode, for the UE 115-*d* to recover from an uplink synchronization loss. Alternative examples of the following may be implemented, where some steps may be performed in a different order than described or not performed at all. In some implementations, steps may include additional features not mentioned below, or further steps may be added.

At 705, the network entity 105-*c* may transmit an SSB, SIB, a reference signal (RS), and/or RRC signaling, which may be received by the UE 115-*d*. At 710, the UE 115-*d* may perform downlink synchronization and/or may perform system information (SI) decoding and measurement based on the signaling received at 705. At 715, the UE 115-*c* may transmit a msgA preamble on a PRACH to the network entity 105-*c*. At 720, the UE 115-*d* may transmit a msgA payload on a PUSCH to the network entity 105-*c*. At 725, the network entity 105-*b* may process the msgA preamble and payload that includes an RRC connection request, an SR, and/or a buffer status. At 730, the network entity 105-*b* may transmit a msgB on a PDCCH to the network entity 105-*c*. At 735, the network entity 105-*b* may transmit the msgB on a PDSCH to the network entity 105-*c*. The msgB may include a timing advance, TC-RNTI, and a content resolution message. At 740, the UE 115-*d* may transmit feedback information on a PUCCH (e.g., HARQ ACK/NACK) to the network entity 105-*c*.

In some examples, rate-splitting may be used on initial access messages, such as the RACH messages of the above described 4-step RACH procedure of FIG. 6 and the 2-step RACH procedure of FIG. 7. For example, the network entity 105 may transmit a common portion of a rate-split transmission across combined SSB beams to multiple UEs 115, and the network entity 105 may transmit a private portion of a rate-split transmission to the dedicated UEs. In some examples, the rate-splitting technique may be applied with 1 layer transmissions. In some examples, both the common portion and the private portion may be transmitted on the same beam, such as a single SSB beam. Using different power control at the network entity 105-*c*, the UE 115-*d* may remove the common portion and determine the private portion assuming more power is put to the common portion.

In some examples, the network entity 105 may indicate in MIB whether SIB1 PDSCH, msg2 or msg4 in the 4-step RACH procedure, msgB in the 2-step RACH procedure or one or more other SIBs (OSIBs) are transmitted using a rate-splitting scheme. In some examples, the network entity 105 may indicate in the SIB's PDCCH that the SIB's PDSCH is transmitted using a rate-splitting scheme. In some examples, the network entity 105 may indicate in the SIB PDCCH or SIB PDSCH whether the msg2 or msg4 in the 4-step RACH procedure or msgB in the 2-step RACH, or OSIBs are transmitted using a rate-splitting scheme. In some examples, the network entity 105 may indicate in the msg2 PDCCH of the 4-step RACH whether the msg2 PDSCH is transmitted using a rate-splitting scheme. The network entity 105 may indicate in the msg2 PDCCH or the msg2 PDSCH whether the msg4 OSIBs in 4-step RACH or msgB OSIBs in the 2-step RACH are transmitted using a rate-splitting scheme. In some examples, if the network entity 105 is transmitting a message using a rate-splitting scheme, the DCI (e.g., in a new DCI format) may include multiple fields for MCS or redundancy versions (RV)s or quantity of layers (or steams) or time domain resource allocation (TDRA) and frequency domain resource allocation (FDRA) if not common between the private portion and the common portion.

In some aspects, different messages may be rate-split together for different UEs. For example, a msg2 for one UE may be rate-split with a msg4 for another UE (e.g., the common portion may include a combined CW that includes the msg2 for one UE and the msg4 for another UE). As another example, an initial access message for one UE (e.g., a ms2, and msg4, or an msgB) may be rate-split with a downlink data message (e.g., a PDSCH message) for another UE.

In some examples, which initial access message will be transmitted using a rate-splitting scheme may be based on an indication in MIB or SIB1. In such examples, some configuration may be fixed as a quantity of layers of each message type. In some examples, the MCS value of the common layer and an MCS table as well as a quantity of layers for each message type may be specified, preconfigured, configured, loaded or stated per band or per band combination (e.g., in RRC signaling).

In some examples, the network entity 105 may indicate in control signaling (e.g., a MIB or a SIB), or in one of the RACH messages, which subsequent RACH messages will be transmitted using a rate-splitting scheme. The control signaling may indicate a quantity of layers and an MCS associated with each rate-split message. The UE 115 may accordingly decode the indicated rate-split RACH messages. In some examples, the DCI of a rate-split message may include one added bit related to use of rate-split in PDSCH. In some examples, the indication of rate-splitting may be in a previous message. For example, the MIB may indicate rate-splitting for a SIB1.

In some examples, if a PDCCH is used to indicate whether the PDSCH is using rate-splitting, then the search space, format, radio network temporary identifier (RNTI) or size of the DCI is different from a legacy DCI, and the UE 115 may search for both (e.g., similar as regular rate-split DCI search in other connected mode messages). In some examples, the MCS tables used for the private portion and the common portion for each initial access message may be provided in the MIB, provided in the SIB1, provided in the corresponding PDCCH or base on some procedure to find the PDCCH type or format (e.g., some RNTI or search space combination), or preconfigured and changing per band or frequency range. In some examples, the MCS tables used for the private portion and the common portion for each initial access message may be common between all or set of initial access messages and may be provided in specification per band or per frequency range or signaled in the MIB or signal in the SIB1.

Figure 8:
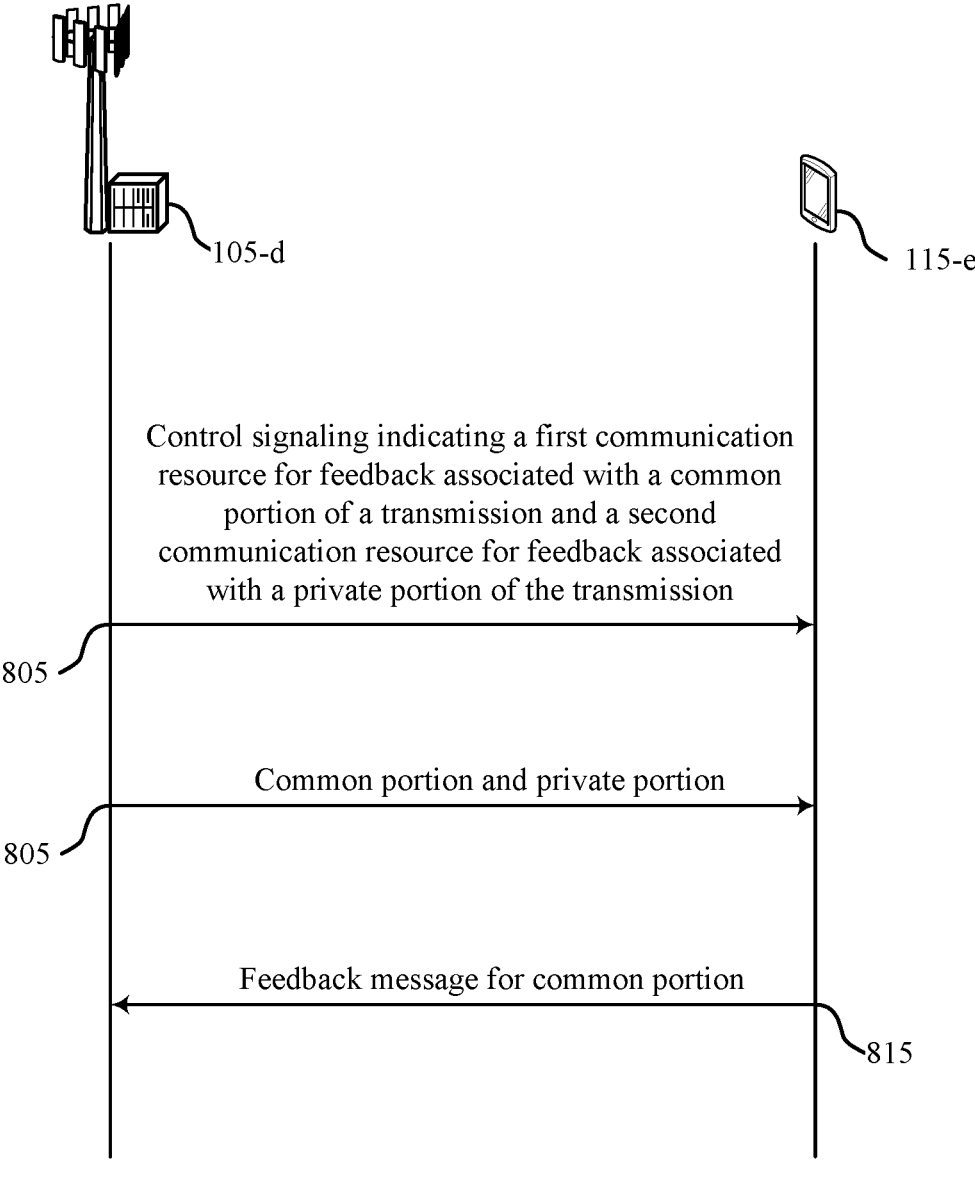
FIG. 8 illustrates an example of process flow that supports priority and feedback for rate-split schemes in accordance with one or more aspects of the present disclosure.
Figure 8:
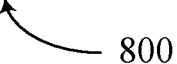

FIG. 8 illustrates an example of a process flow 800 that supports priority and feedback for rate-split schemes in accordance with one or more aspects of the present disclosure. The process flow 800 may include a UE 115-e and a network entity 105-d which may be examples of the corresponding devices described herein. In the following description of the process flow 800, the operations between the network entity 105-d and the UE 115-e may be transmitted in a different order than the example order shown, or the operations performed by the network entity 105-d and the UE 115-e may be performed in different orders or at different times. Some operations may also be omitted from the process flow 800, and other operations may be added to the process flow 800.

At 805, the network entity 105-d may transmit control signaling indicating a first communication resource for feedback associated with a common portion of a transmission (e.g., a rate-split transmission) and a second communication resource for feedback associated with a private portion of the transmission. At 810, the network entity 105-d may transmit the common portion and the private portion. At step 815, the UE 115-e may transmit a feedback message for the common portion via one of via one of the first communication resource or the second communication resource.

In some examples, the UE 115-e may transmit an indication of a first processing time for the UE 115-e associated with preparation of feedback for common portions of transmissions and a second processing time for the UE 115-e associated with preparation of feedback for private portions of transmissions. The control signaling at 805 may be responsive to the indication of the first and second processing times.

In some examples, the UE 115-e may transmit the feedback message for the common portion in the first feedback resource and the feedback message for the private portion in the second feedback resource.

In some examples, the UE 115-e may cancel a transmission of the feedback message for the private portion if the UE 115-e transmits a negative acknowledgment feedback message for the common portion.

In some examples, the UE 115-e may transmit the feedback message for the common portion via the second feedback resource if the first feedback resource is unavailable (e.g., due to a scheduling conflict) and may cancel transmission of a feedback message for the private portion.

In some examples, the UE 115-e may determine that the first feedback resource is unavailable and may multiplex the feedback message for the common portion with the feedback message for the private portion and transmit the feedback message and the second feedback message in a same transmission via the second feedback resource. In some examples, the UE 115-e may transmit the feedback message via a first subset of communication resources of the second communication resource and may transmit the second feedback message via a second subset of communication resources of the second communication resource. In some examples, the UE 115-e may encode the feedback message and the second feedback in a same CW using a polar encoder or a single cyclic shift.

In some examples, the first feedback resource may include a set of symbols of a slot and the second feedback resource may include a second set of symbols of the slot.

In some examples, UE 115-e may transmit the feedback message via the first feedback resource based on the feedback message having a higher priority than an uplink control message (e.g., another UCI) scheduled for transmission via the first resource and may cancel a transmission of the uplink control message. In some examples, the UE 115-e may determine that an uplink control message is scheduled for transmission via the second communication resource, the UE 115-e may transmit the uplink control message via the second communication resource base on the uplink control message having a higher priority level than a feedback message for the private portion, and the UE 115-e may cancel the transmission of the feedback message for the private portion.

In some examples, the UE 115-e may receive control signaling indicating a timing offset between communication resources for feedback for common portions and communication resources for private portions and the control signaling includes an indication of a starting time (e.g., a first RB) for the first communication resource. Accordingly, the UE 115-e may determine the second communication resource based on the timing offset and the starting time of the first communication resource.

In some examples, the UE 115-e may receive a DCI scheduling the transmission.

In some examples, the UE 115-e may receive second control signaling indicating that a RACH message is rate-split and the transmission includes the RACH message.

Figure 9:
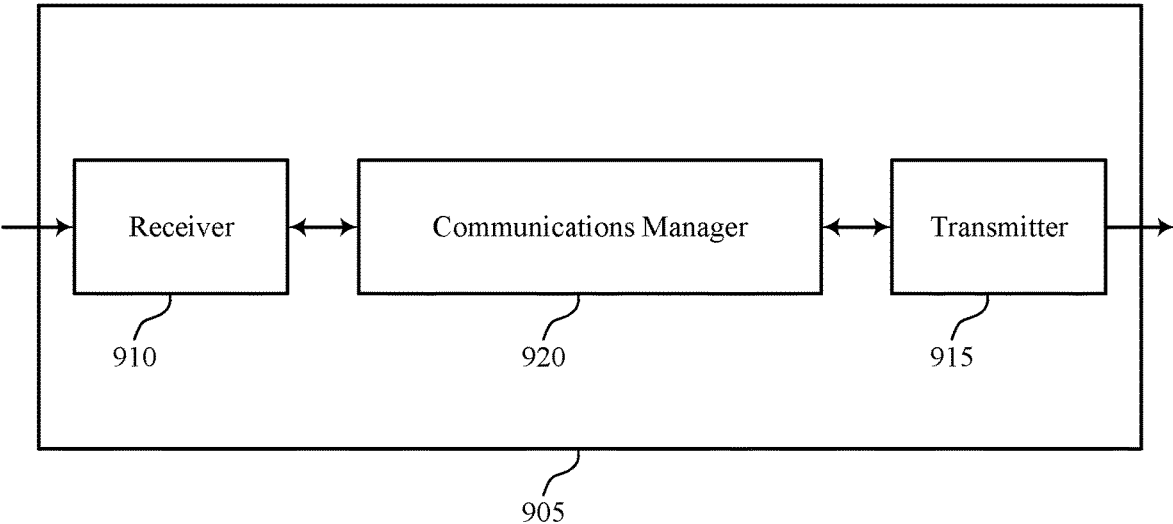
FIGS. 9 and 10 show block diagrams of devices that support priority and feedback for rate-split schemes in accordance with one or more aspects of the present disclosure.
Figure 9:

FIG. 9 shows a block diagram 900 of a device 905 that supports priority and feedback for rate-split schemes in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to priority and feedback for rate-split schemes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to priority and feedback for rate-split schemes). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of priority and feedback for rate-split schemes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other program-mable logic device, a microcontroller, discrete gate or tran-sistor logic, discrete hardware components, or any combi-nation thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the com-munications manager 920, the receiver 910, the transmitter 915, or various combinations or components thereof may be implemented in code (e.g., as communications management software) executed by a processor. If implemented in code executed by a processor, the functions of the communica-tions manager 920, the receiver 910, the transmitter 915, or various combinations or components thereof may be per-formed by a general-purpose processor, a DSP, a CPU, a GPU, an ASIC, an FPGA, a microcontroller, or any com-bination of these or other programmable logic devices (e.g., configured as or otherwise supporting a means for perform-ing the functions described in the present disclosure).

In some examples, the communications manager 920 may be configured to perform various operations (e.g., receiving, obtaining, monitoring, outputting, transmitting) using or otherwise in cooperation with the receiver 910, the trans-mitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. For example, the communications manager 920 may be configured as or otherwise support a means for receiving control signaling indicating a first communication resource for feedback associated with a common portion of a transmission and a second communication resource for feedback associated with a private portion of the transmis-sion, where the second communication resource is subse-quent to the first communication resource. The communi-cations manager 920 may be configured as or otherwise support a means for receiving the transmission including the common portion and the private portion. The communica-tions manager 920 may be configured as or otherwise support a means for transmitting a feedback message for the common portion via one of the first communication resource or the second communication resource.

By including or configuring the communications manager 920 in accordance with examples as described herein, the device 905 (e.g., a processor controlling or otherwise coupled with the receiver 910, the transmitter 915, the communications manager 920, or a combination thereof)

may support techniques for reduced processing, reduced power consumption, and more efficient utilization of com-munication resources.

Figure 10:
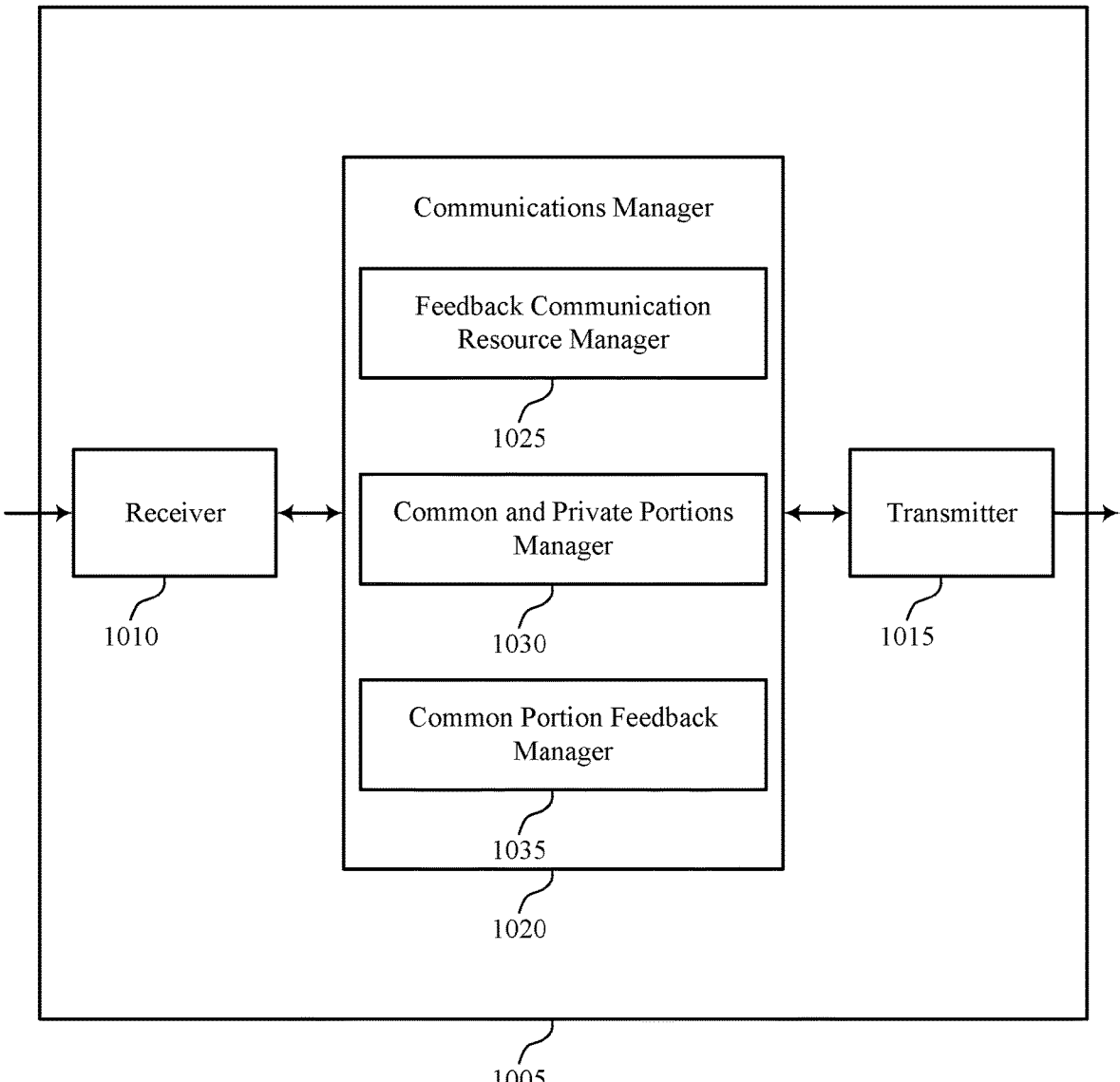

FIG. 10 shows a block diagram 1000 of a device 1005 that supports priority and feedback for rate-split schemes in accordance with one or more aspects of the present disclo-sure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various infor-mation channels (e.g., control channels, data channels, infor-mation channels related to priority and feedback for rate-split schemes). Information may be passed on to other components of the device 1005. The receiver 1010 may utilize a single antenna or a set of multiple antennas.

The transmitter 1015 may provide a means for transmit-ting signals generated by other components of the device 1005. For example, the transmitter 1015 may transmit information such as packets, user data, control information, or any combination thereof associated with various infor-mation channels (e.g., control channels, data channels, infor-mation channels related to priority and feedback for rate-split schemes). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of priority and feedback for rate-split schemes as described herein. For example, the communications manager 1020 may include a feedback communication resource manager 1025, a common and private portions manager 1030, a common portion feedback manager 1035, or any combina-tion thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the trans-mitter 1015, or both. For example, the communications manager 1020 may receive information from the receiver 1010, send information to the transmitter 1015, or be inte-grated in combination with the receiver 1010, the transmitter 1015, or both to obtain information, output information, or perform various other operations as described herein.

The communications manager 1020 may support wireless communications at a UE in accordance with examples as disclosed herein. The feedback communication resource manager 1025 may be configured as or otherwise support a means for receiving control signaling indicating a first communication resource for feedback associated with a common portion of a transmission and a second communi-cation resource for feedback associated with a private por-tion of the transmission, where the second communication resource is subsequent to the first communication resource. The common and private portions manager 1030 may be configured as or otherwise support a means for receiving the transmission including the common portion and the private portion. The common portion feedback manager 1035 may be configured as or otherwise support a means for transmitting a feedback message for the common portion via one of the first communication resource or the second communication resource.

Figure 11:
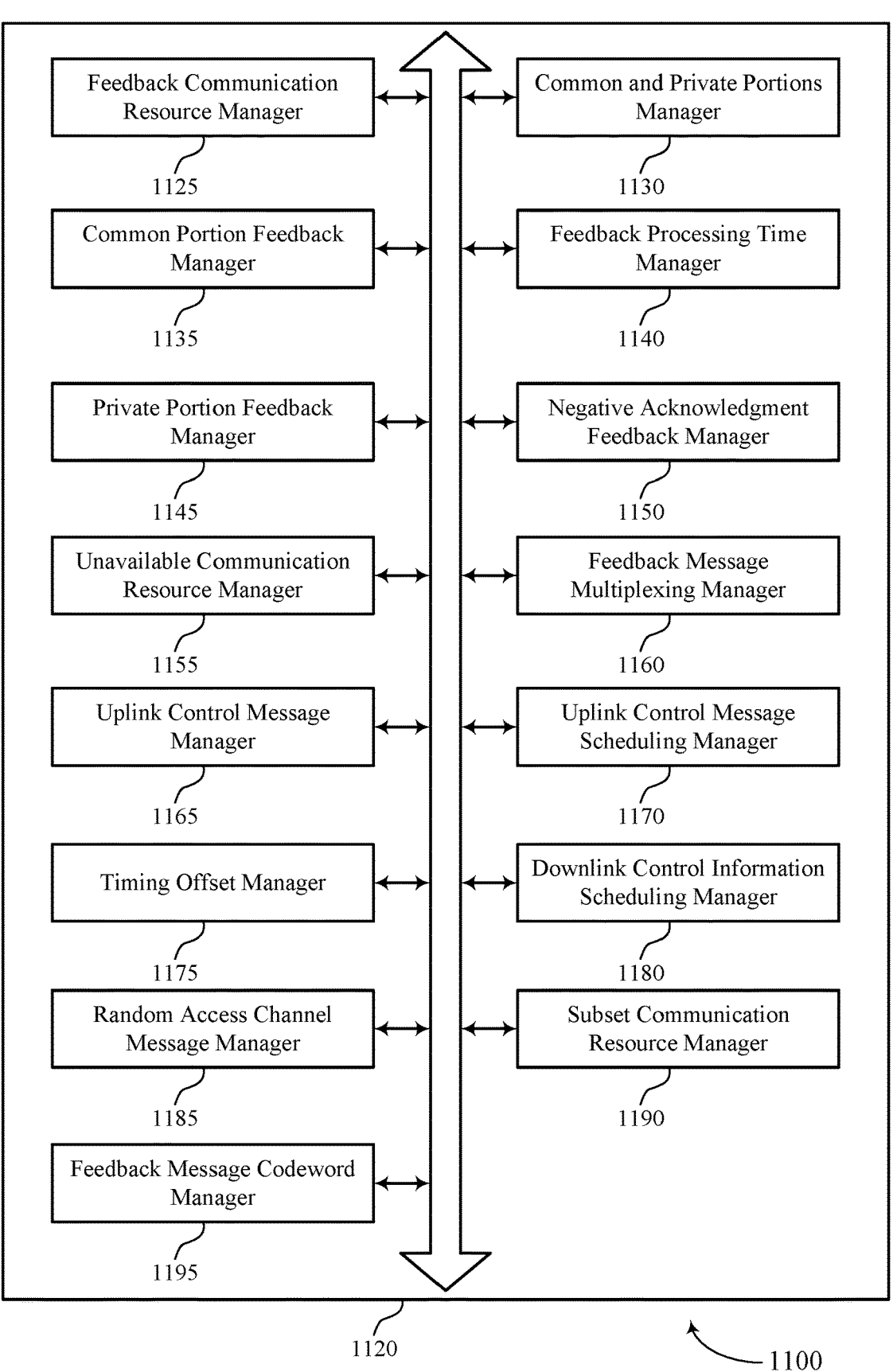
FIG. 11 shows a block diagram of a communications manager that supports priority and feedback for rate-split schemes in accordance with one or more aspects of the present disclosure.

FIG. 11 shows a block diagram 1100 of a communications manager 1120 that supports priority and feedback for rate-split schemes in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of priority and feedback for rate-split schemes as described herein. For example, the communications manager 1120 may include a feedback communication resource manager 1125, a common and private portions manager 1130, a common portion feedback manager 1135, a feedback processing time manager 1140, a private portion feedback manager 1145, a negative acknowledgment feedback manager 1150, an unavailable communication resource manager 1155, a feedback message multiplexing manager 1160, an uplink control message manager 1165, an uplink control message scheduling manager 1170, a timing offset manager 1175, a DCI scheduling manager 1180, a RACH message manager 1185, a subset communication resource manager 1190, a feedback message codeword manager 1195, or any combination thereof. Each of these components may communicate, directly or indirectly, with one another (e.g., via one or more buses).

The communications manager 1120 may support wireless communications at a UE in accordance with examples as disclosed herein. The feedback communication resource manager 1125 may be configured as or otherwise support a means for receiving control signaling indicating a first communication resource for feedback associated with a common portion of a transmission and a second communication resource for feedback associated with a private portion of the transmission, where the second communication resource is subsequent to the first communication resource. The common and private portions manager 1130 may be configured as or otherwise support a means for receiving the transmission including the common portion and the private portion. The common portion feedback manager 1135 may be configured as or otherwise support a means for transmitting a feedback message for the common portion via one of the first communication resource or the second communication resource.

In some examples, the feedback processing time manager 1140 may be configured as or otherwise support a means for transmitting an indication of a first processing time for the UE associated with preparation of feedback for common portions of transmissions and a second processing time for the UE associated with preparation of feedback for private portions of transmissions, where receiving the control signaling is responsive to the indication.

In some examples, the private portion feedback manager 1145 may be configured as or otherwise support a means for transmitting a second feedback message for the private portion via the second communication resource, where transmitting the feedback message for the common portion includes transmitting the feedback message via the first communication resource.

In some examples, the negative acknowledgment feedback manager 1150 may be configured as or otherwise support a means for cancelling a transmission of a second feedback message for the private portion via the second communication resource based on transmitting the feedback message for the common portion including transmitting a negative acknowledgment for the common portion via the first communication resource.

In some examples, the unavailable communication resource manager 1155 may be configured as or otherwise support a means for determining that the first communication resource is unavailable for transmission of the feedback message, where transmitting the feedback message for the common portion includes transmitting the feedback message via the second communication resource. In some examples, the private portion feedback manager 1145 may be configured as or otherwise support a means for cancelling a transmission of a second feedback message for the private portion via the second communication resource.

In some examples, the feedback message multiplexing manager 1160 may be configured as or otherwise support a means for determining that the first communication resource is unavailable for transmission of the feedback message, where transmitting the feedback message for the common portion includes multiplexing the feedback message with a second feedback message for the private portion in a same transmission via the second communication resource.

In some examples, to support multiplexing the feedback message with the second feedback message, the subset communication resource manager 1190 may be configured as or otherwise support a means for transmitting the feedback message via a first subset of communication resources of the second communication resource and transmitting the second feedback message via a second subset of communication resources of the second communication resource.

In some examples, to support multiplexing the feedback message with the second feedback message, the feedback message codeword manager 1195 may be configured as or otherwise support a means for encoding the feedback message and the second feedback message in a same codeword using one of a polar encoder or a single cyclic shift.

In some examples, the first communication resource includes a first set of symbols of a slot, and the second communication resource includes a second set of symbols of the slot.

In some examples, the uplink control message manager 1165 may be configured as or otherwise support a means for cancelling a transmission of the uplink control message scheduled for transmission via the first communication resource, where the feedback message is transmitted via the first communication resource based on the feedback message having a higher priority level than the uplink control message.

In some examples, the uplink control message scheduling manager 1170 may be configured as or otherwise support a means for determining that an uplink control message is scheduled for transmission via the second communication resource. In some examples, the uplink control message manager 1165 may be configured as or otherwise support a means for transmitting the uplink control message via the second communication resource based on the uplink control message having a higher priority level than a second feedback message for the private portion. In some examples, the private portion feedback manager 1145 may be configured as or otherwise support a means for cancelling a transmission of the second feedback message for the private portion via the second communication resource.

In some examples, the timing offset manager 1175 may be configured as or otherwise support a means for receiving second control signaling indicating a timing offset between communications resources for feedback for common portions of transmissions and communications resources for feedback for private portions of transmissions, and where receiving the control signaling includes receiving an indication of a starting time for the first communication resource.

In some examples, to support receiving the control signaling, the DCI scheduling manager 1180 may be configured as or otherwise support a means for receiving a DCI scheduling the transmission.

In some examples, the RACH message manager 1185 may be configured as or otherwise support a means for receiving second control signaling indicating that a RACH message is rate-split, where the transmission includes the RACH message.

Figure 12:
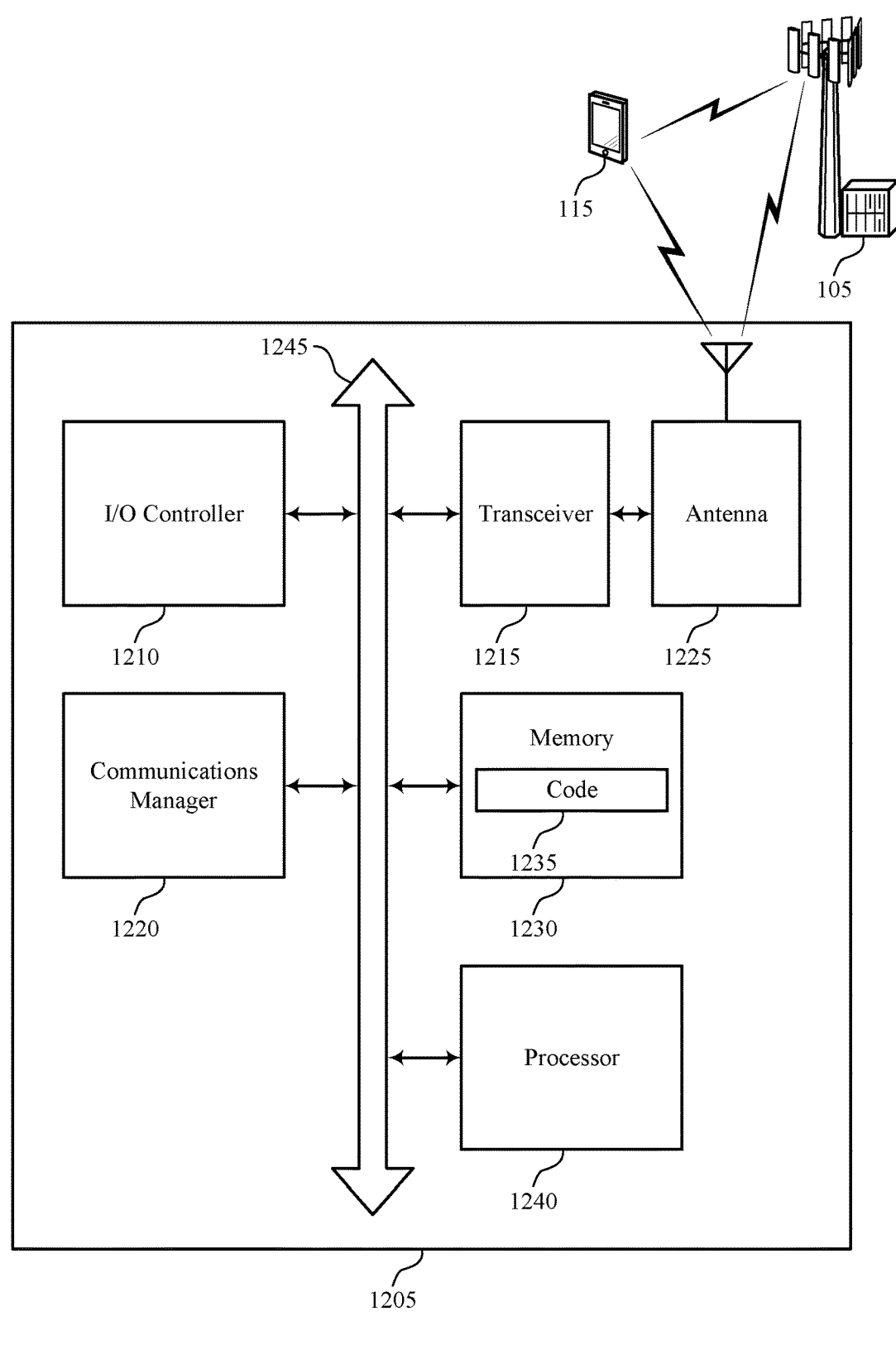
FIG. 12 shows a diagram of a system including a device that supports priority and feedback for rate-split schemes in accordance with one or more aspects of the present disclosure.

FIG. 12 shows a diagram of a system 1200 including a device 1205 that supports priority and feedback for rate-split schemes in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting priority and feedback for rate-split schemes). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving control signaling indicating a first communication resource for feedback associated with a common portion of a transmission and a second communication resource for feedback associated with a private portion of the transmission, where the second communication resource is subsequent to the first communication resource. The communications manager 1220 may be configured as or otherwise support a means for receiving the transmission including the common portion and the private portion. The communications manager 1220 may be configured as or otherwise support a means for transmitting a feedback message for the common portion via one of the first communication resource or the second communication resource.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of priority and feedback for rate-split schemes as described herein, or the processor 1240 and the memory 1230 may be otherwise configured to perform or support such operations.

Figure 13:
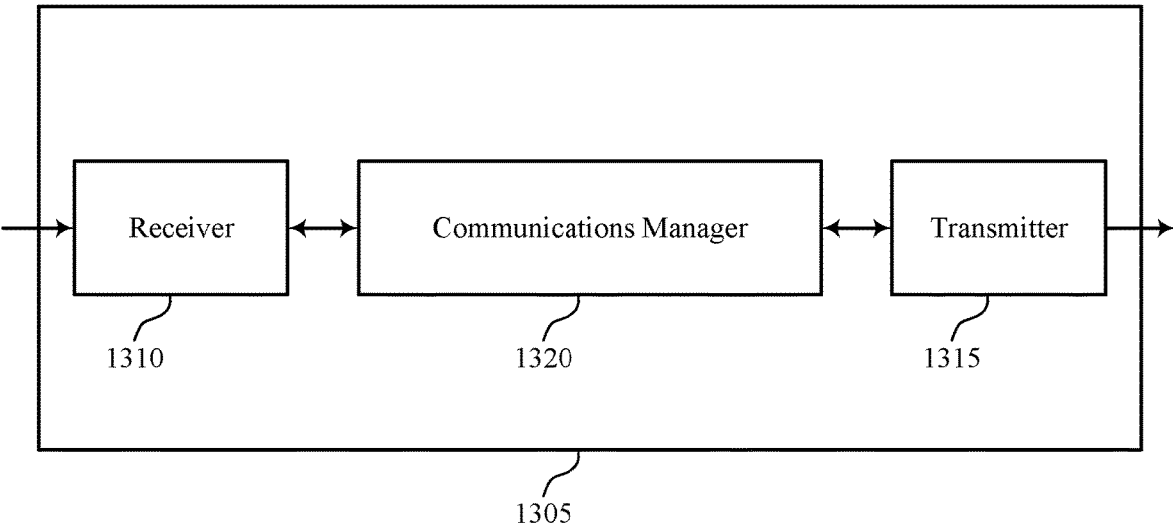
FIGS. 13 and 14 show block diagrams of devices that support priority and feedback for rate-split schemes in accordance with one or more aspects of the present disclosure.

FIG. 13 shows a block diagram 1300 of a device 1305 that supports priority and feedback for rate-split schemes in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of priority and feedback for rate-split schemes as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software) executed by a processor. If implemented in code executed by a processor, the functions of the communications manager 1320, the receiver 1310, the transmitter 1315, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. For example, the communications manager 1320 may be configured as or otherwise support a means for transmitting, to a UE, control signaling indicating a first communication resource for feedback associated with a common portion of a transmission and a second communication resource for feedback associated with a private portion of the transmission, where the second communication resource is subsequent to the first communication resource. The communications manager 1320 may be configured as or otherwise support a means for transmitting, to the UE, the transmission including the common portion and the private portion. The communications manager 1320 may be configured as or otherwise support a means for receiving, from the UE, a feedback message for the common portion via one of the first communication resource or the second communication resource.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing, reduced power consumption, more efficient utilization of communication resources.

Figure 14:
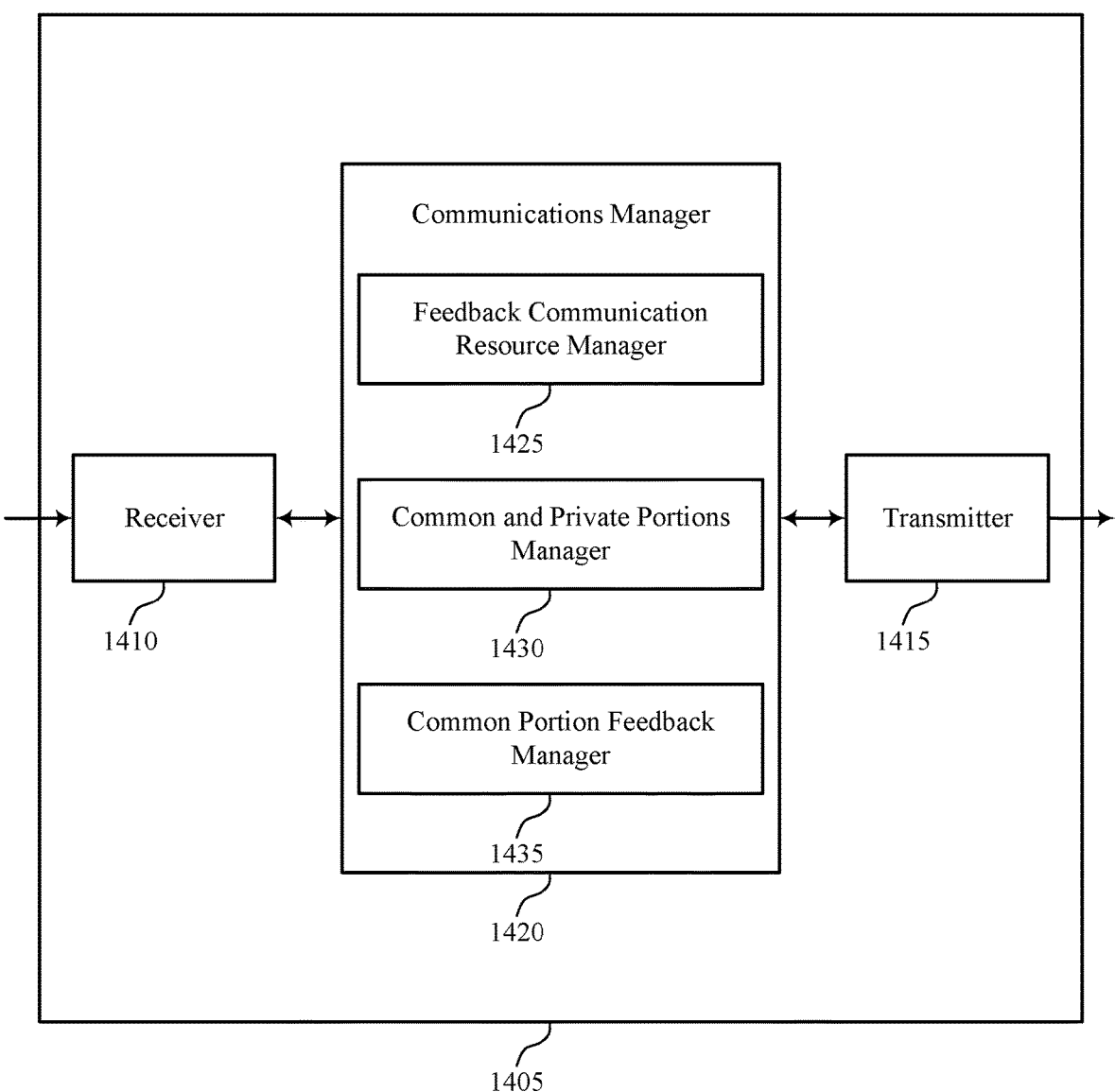

FIG. 14 shows a block diagram 1400 of a device 1405 that supports priority and feedback for rate-split schemes in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of priority and feedback for rate-split schemes as described herein. For example, the communications manager 1420 may include a feedback communication resource manager 1425, a common and private portions manager 1430, a common portion feedback manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. The feedback communication resource manager 1425 may be configured as or otherwise support a means for transmitting, to a UE, control signaling indicating a first communication resource for feedback associated with a common portion of a transmission and a second communication resource for feedback associated with a private portion of the transmission, where the second communication resource is subsequent to the first communication resource. The common and private portions manager 1430 may be configured as or otherwise support a means for transmitting, to the UE, the transmission including the common portion and the private portion. The common portion feedback manager 1435 may be configured as or otherwise support a means for receiving, from the UE, a feedback message for the common portion via one of the first communication resource or the second communication resource.

Figure 15:
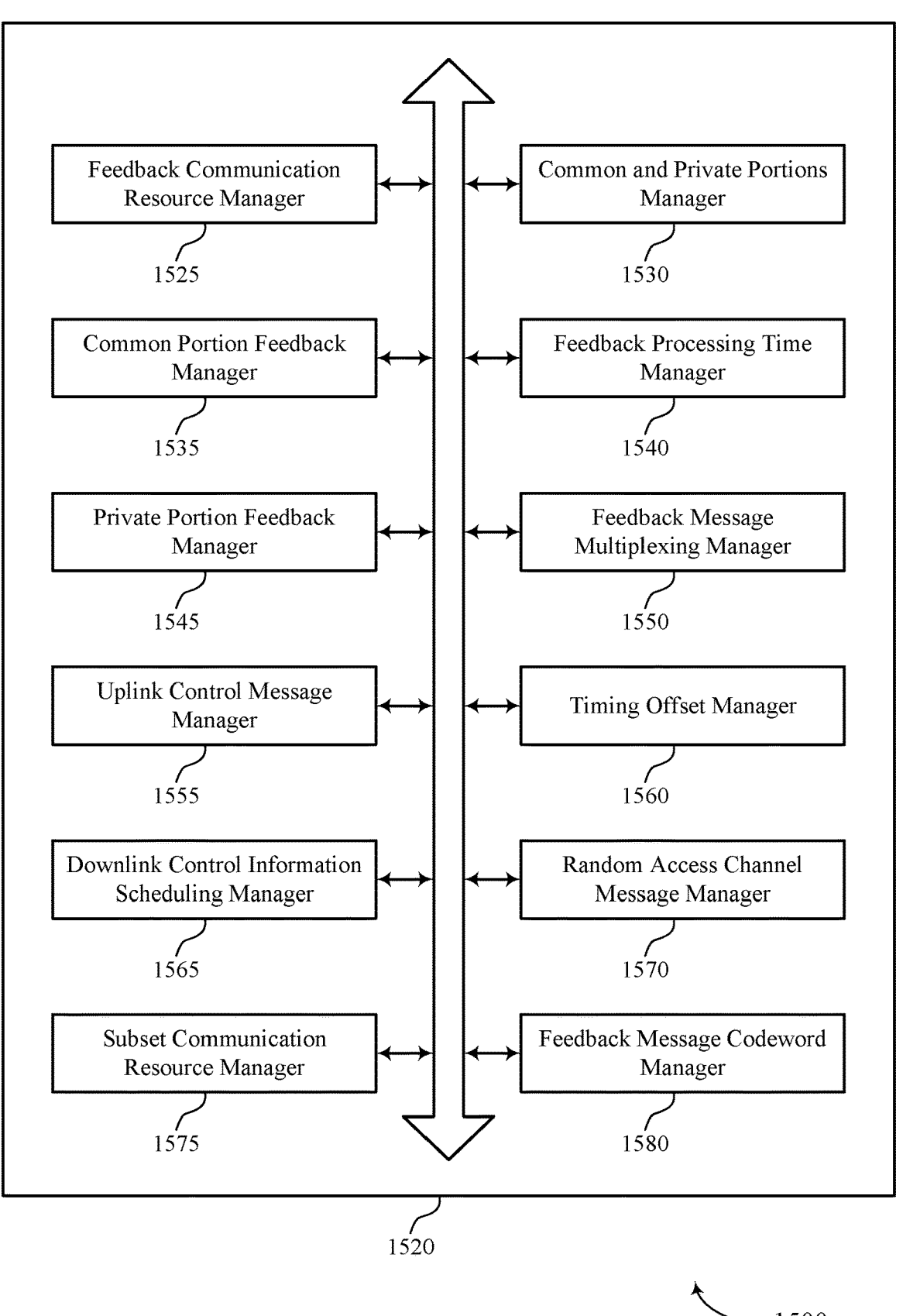
FIG. 15 shows a block diagram of a communications manager that supports priority and feedback for rate-split schemes in accordance with one or more aspects of the present disclosure.

FIG. 15 shows a block diagram 1500 of a communications manager 1520 that supports priority and feedback for rate-split schemes in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of priority and feedback for rate-split schemes as described herein. For example, the communications manager 1520 may include a feedback communication resource manager 1525, a common and private portions manager 1530, a common portion feedback manager 1535, a feedback processing time manager 1540, a private portion feedback manager 1545, a feedback message multiplexing manager 1550, an uplink control message manager 1555, a timing offset manager 1560, a DCI scheduling manager 1565, a RACH message manager 1570, a subset communication resource manager 1575, a feedback message codeword manager 1580, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications at a network entity in accordance with examples as disclosed herein. The feedback communication resource manager 1525 may be configured as or otherwise support a means for transmitting, to a UE, control signaling indicating a first communication resource for feedback associated with a common portion of a transmission and a second communication resource for feedback associated with a private portion of the transmission, where the second communication resource is subsequent to the first communication resource. The common and private portions manager 1530 may be configured as or otherwise support a means for transmitting, to the UE, the transmission including the common portion and the private portion. The common portion feedback manager 1535 may be configured as or otherwise support a means for receiving, from the UE, a feedback message for the common portion via one of the first communication resource or the second communication resource.

In some examples, the feedback processing time manager 1540 may be configured as or otherwise support a means for receiving, from the UE, an indication of a first processing time for the UE associated with preparation of feedback for common portions of transmissions and a second processing time for the UE associated with preparation of feedback for private portions of transmissions, where transmitting the control signaling is responsive to the indication.

In some examples, the private portion feedback manager 1545 may be configured as or otherwise support a means for receiving a second feedback message for the private portion via the second communication resource, where receiving the feedback message for the common portion includes receiving the feedback message via the first communication resource.

In some examples, to support receiving the feedback message for the common portion, the common portion feedback manager 1535 may be configured as or otherwise support a means for receiving the feedback message via the second communication resource, and where a second feedback message for the private portion is not received via the second communication resource.

In some examples, to support receiving the feedback message for the common portion, the feedback message multiplexing manager 1550 may be configured as or otherwise support a means for receiving the feedback message multiplexed with a second feedback message for the private portion in a same transmission via the second communication resource.

In some examples, to support receiving the feedback message multiplexed with the second feedback message for the private portion, the subset communication resource manager 1575 may be configured as or otherwise support a means for receiving the feedback message via a first subset of communication resources of the second communication resource and receiving the second feedback message via a second subset of communication resources of the second communication resource.

In some examples, to support receiving the feedback message multiplexed with the second feedback message for the private portion, the feedback message codeword manager 1580 may be configured as or otherwise support a means for decoding the feedback message and the second feedback message in a same codeword using one of a polar encoder or a single cyclic shift.

In some examples, the first communication resource includes a first set of symbols of a slot, and the second communication resource includes a second set of symbols of the slot.

In some examples, the feedback message is received via the first communication resource based on the feedback message having a higher priority level than an uplink control message scheduled for transmission via the first communication resource.

In some examples, the uplink control message manager 1555 may be configured as or otherwise support a means for receiving an uplink control message via the second communication resource based on the uplink control message having a higher priority level than a second feedback message for the private portion.

In some examples, the timing offset manager 1560 may be configured as or otherwise support a means for transmitting second control signaling indicating a timing offset between communications resources for feedback for common portions of transmissions and communications resources for feedback for private portions of transmissions, and where transmitting the control signaling includes transmitting an indication of a starting time for the first communication resource.

In some examples, to support receiving the control signaling, the DCI scheduling manager 1565 may be configured as or otherwise support a means for transmitting a DCI scheduling the transmission.

In some examples, the RACH message manager 1570 may be configured as or otherwise support a means for transmitting second control signaling indicating that a RACH message is rate-split, where the transmission includes the RACH message.

Figure 16:
FIG. 16 shows a diagram of a system including a device that supports priority and feedback for rate-split schemes in accordance with one or more aspects of the present disclosure.

FIG. 16 shows a diagram of a system 1600 including a device 1605 that supports priority and feedback for rate-split schemes in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired inter-faces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting priority and feedback for rate-split schemes). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communications at a network entity in accordance with examples as disclosed herein. For example, the communications manager 1620 may be configured as or otherwise support a means for transmitting, to a UE, control signaling indicating a first communication resource for feedback associated with a common portion of a transmission and a second communication resource for feedback associated with a private portion of the transmission, where the second communication resource is subsequent to the first communication resource. The communications manager 1620 may be configured as or otherwise support a means for transmitting, to the UE, the transmission including the common portion and the private portion. The communications manager 1620 may be configured as or otherwise support a means for receiving, from the UE, a feedback message for the common portion via one of the first communication resource or the second communication resource.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of priority and feedback for rate-split schemes as described herein, or the processor 1635 and the memory 1625 may be otherwise configured to perform or support such operations.

FIG. 17 shows a flowchart illustrating a method 1700 that supports priority and feedback for rate-split schemes in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving control signaling indicating a first communication resource for feedback associated with a common portion of a transmission and a second communication resource for feedback associated with a private portion of the transmission, where the second communication resource is subsequent to the first communication resource. The operations of 1705 may be performed in accordance with examples as disclosed herein. In some examples, aspects of the operations of 1705 may be performed by a feedback communication resource manager 1125 as described with reference to FIG. 11.

At 1710, the method may include receiving the transmission including the common portion and the private portion. The operations of 1710 may be performed in accordance with examples as disclosed herein. In some examples, aspects of the operations of 1710 may be performed by a common and private portions manager 1130 as described with reference to FIG. 11.

At 1715, the method may include transmitting a feedback message for the common portion via one of the first communication resource or the second communication resource. The operations of 1715 may be performed in accordance with examples as disclosed herein. In some examples, aspects of the operations of 1715 may be performed by a common portion feedback manager 1135 as described with reference to FIG. 11.

FIG. 18 shows a flowchart illustrating a method 1800 that supports priority and feedback for rate-split schemes in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving control signaling indicating a first communication resource for feedback associated with a common portion of a transmission and a second communication resource for feedback associated with a private portion of the transmission, where the second communication resource is subsequent to the first communication resource. The operations of 1805 may be performed in accordance with examples as disclosed herein. In some examples, aspects of the operations of 1805 may be performed by a feedback communication resource manager 1125 as described with reference to FIG. 11.

At 1810, the method may include receiving the transmission including the common portion and the private portion. The operations of 1810 may be performed in accordance with examples as disclosed herein. In some examples, aspects of the operations of 1810 may be performed by a common and private portions manager 1130 as described with reference to FIG. 11.

At 1815, the method may include transmitting a feedback message for the common portion via one of the first communication resource or the second communication resource. The operations of 1815 may be performed in accordance with examples as disclosed herein. In some examples, aspects of the operations of 1815 may be performed by a common portion feedback manager 1135 as described with reference to FIG. 11.

At 1820, the method may include transmitting a second feedback message for the private portion via the second communication resource, where transmitting the feedback message for the common portion includes transmitting the feedback message via the first communication resource. The operations of 1820 may be performed in accordance with examples as disclosed herein. In some examples, aspects of the operations of 1820 may be performed by a private portion feedback manager 1145 as described with reference to FIG. 11.

FIG. 19 shows a flowchart illustrating a method 1900 that supports priority and feedback for rate-split schemes in accordance with one or more aspects of the present disclosure. The operations of the method 1900 may be implemented by a network entity or its components as described herein. For example, the operations of the method 1900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, control signaling indicating a first communication resource for feedback associated with a common portion of a transmission and a second communication resource for feedback associated with a private portion of the transmission, where the second communication resource is subsequent to the first communication resource. The operations of 1905 may be performed in accordance with examples as disclosed herein. In some examples, aspects of the operations of 1905 may be performed by a feedback communication resource manager 1525 as described with reference to FIG. 15.

At 1910, the method may include transmitting, to the UE, the transmission including the common portion and the private portion. The operations of 1910 may be performed in accordance with examples as disclosed herein. In some examples, aspects of the operations of 1910 may be performed by a common and private portions manager 1530 as described with reference to FIG. 15.

At 1915, the method may include receiving, from the UE, a feedback message for the common portion via one of the first communication resource or the second communication resource. The operations of 1915 may be performed in accordance with examples as disclosed herein. In some examples, aspects of the operations of 1915 may be performed by a common portion feedback manager 1535 as described with reference to FIG. 15.

FIG. 20 shows a flowchart illustrating a method 2000 that supports priority and feedback for rate-split schemes in accordance with one or more aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include receiving, from a UE, an indication of a first processing time for the UE associated with preparation of feedback for common portions of transmissions and a second processing time for the UE associated with preparation of feedback for private portions of transmissions. The operations of 2005 may be performed in accordance with examples as disclosed herein. In some examples, aspects of the operations of 2005 may be performed by a feedback processing time manager 1540 as described with reference to FIG. 15.

At 2010, the method may include transmitting, to the UE, control signaling indicating a first communication resource for feedback associated with a common portion of a transmission and a second communication resource for feedback associated with a private portion of the transmission, where the second communication resource is subsequent to the first communication resource, and where transmitting the control signaling is responsive to the indication. The operations of 2010 may be performed in accordance with examples as disclosed herein. In some examples, aspects of the operations of 2010 may be performed by a feedback communication resource manager 1525 as described with reference to FIG. 15.

At 2015, the method may include transmitting, to the UE, the transmission including the common portion and the private portion. The operations of 2015 may be performed in accordance with examples as disclosed herein. In some examples, aspects of the operations of 2015 may be performed by a common and private portions manager 1530 as described with reference to FIG. 15.

At 2020, the method may include receiving, from the UE, a feedback message for the common portion via one of the first communication resource or the second communication resource. The operations of 2020 may be performed in accordance with examples as disclosed herein. In some examples, aspects of the operations of 2020 may be performed by a common portion feedback manager 1535 as described with reference to FIG. 15.

The following provides an overview of aspects of the present disclosure:

Aspect 1: A method for wireless communications at a UE, comprising: receiving control signaling indicating a first communication resource for feedback associated with a common portion of a transmission and a second communication resource for feedback associated with a private portion of the transmission, wherein the second communication resource is subsequent to the first communication resource; receiving the transmission comprising the common portion and the private portion; and transmitting a feedback message for the common portion via one of the first communication resource or the second communication resource.

Aspect 2: The method of aspect 1, further comprising: transmitting an indication of a first processing time for the UE associated with preparation of feedback for common portions of transmissions and a second processing time for the UE associated with preparation of feedback for private portions of transmissions, wherein receiving the control signaling is responsive to the indication.

Aspect 3: The method of any of aspects 1 through 2, further comprising: transmitting a second feedback message for the private portion via the second communication resource, wherein transmitting the feedback message for the common portion comprises transmitting the feedback message via the first communication resource.

Aspect 4: The method of any of aspects 1 through 2, further comprising: cancelling a transmission of a second feedback message for the private portion via the second communication resource based at least in part on transmitting the feedback message for the common portion comprising transmitting a negative acknowledgment for the common portion via the first communication resource.

Aspect 5: The method of any of aspects 1 through 2, further comprising: determining that the first communication resource is unavailable for transmission of the feedback message, wherein transmitting the feedback message for the common portion comprises transmitting the feedback message via the second communication resource; and cancelling a transmission of a second feedback message for the private portion via the second communication resource.

Aspect 6: The method of any of aspects 1 through 2, further comprising: determining that the first communication resource is unavailable for transmission of the feedback message, wherein transmitting the feedback message for the common portion comprises multiplexing the feedback message with a second feedback message for the private portion in a same transmission via the second communication resource.

Aspect 7: The method of aspect 6, wherein multiplexing the feedback message with the second feedback message comprises: transmitting the feedback message via a first subset of communication resources of the second communication resource and transmitting the second feedback message via a second subset of communication resources of the second communication resource.

Aspect 8: The method of aspect 6, wherein multiplexing the feedback message with the second feedback message comprises: encoding the feedback message and the second feedback message in a same CW using one of a polar encoder or a single cyclic shift.

Aspect 9: The method of any of aspects 1 through 8, wherein the first communication resource comprises a first set of symbols of a slot, and the second communication resource comprises a second set of symbols of the slot.

Aspect 10: The method of any of aspects 1 through 9, wherein the feedback message is transmitted via the first communication resource based on the feedback message having a higher priority level than an uplink control message scheduled for transmission via the first communication resource; and further comprising: cancelling a transmission of the uplink control message via the first communication resource.

Aspect 11: The method of any of aspects 1 through 9, further comprising: determining that an uplink control message is scheduled for transmission via the second communication resource; transmitting the uplink control message via the second communication resource based at least in part on the uplink control message having a higher priority level than a second feedback message for the private portion; and cancelling a transmission of the second feedback message for the private portion via the second communication resource.

Aspect 12: The method of any of aspects 1 through 11, further comprising: receiving second control signaling indicating a timing offset between communications resources for feedback for common portions of transmissions and communications resources for feedback for private portions of transmissions, and wherein receiving the control signaling comprises receiving an indication of a starting time for the first communication resource.

Aspect 13: The method of any of aspects 1 through 12, wherein receiving the control signaling comprises: receiving a downlink control information scheduling the transmission.

Aspect 14: The method of any of aspects 1 through 13, further comprising: receiving second control signaling indicating that a RACH message is rate-split, wherein the transmission comprises the RACH message.

Aspect 15: A method for wireless communications at a network entity, comprising: transmitting, to a UE, control signaling indicating a first communication resource for feedback associated with a common portion of a transmission and a second communication resource for feedback associated with a private portion of the transmission, wherein the second communication resource is subsequent to the first communication resource; transmitting, to the UE, the transmission comprising the common portion and the private portion; and receiving, from the UE, a feedback message for the common portion via one of the first communication resource or the second communication resource.

Aspect 16: The method of aspect 15, further comprising: receiving, from the UE, an indication of a first processing time for the UE associated with preparation of feedback for common portions of transmissions and a second processing time for the UE associated with preparation of feedback for private portions of transmissions, wherein transmitting the control signaling is responsive to the indication.

Aspect 17: The method of any of aspects 15 through 16, further comprising: receiving a second feedback message for the private portion via the second communication resource, wherein receiving the feedback message for the common portion comprises receiving the feedback message via the first communication resource.

Aspect 18: The method of any of aspects 15 through 16, wherein receiving the feedback message for the common portion comprises: receiving the feedback message via the second communication resource, and wherein a second feedback message for the private portion is not received via the second communication resource.

Aspect 19: The method of any of aspects 15 through 16, wherein receiving the feedback message for the common portion comprises: receiving the feedback message multiplexed with a second feedback message for the private portion in a same transmission via the second communication resource.

Aspect 20: The method of aspect 19, wherein receiving the feedback message multiplexed with the second feedback message for the private portion comprises: receiving the feedback message via a first subset of communication resources of the second communication resource and receiving the second feedback message via a second subset of communication resources of the second communication resource.

Aspect 21: The method of aspect 19, wherein receiving the feedback message multiplexed with the second feedback message for the private portion comprises: decoding the feedback message and the second feedback message in a same CW using one of a polar encoder or a single cyclic shift.

Aspect 22: The method of any of aspects 15 through 21, wherein the first communication resource comprises a first set of symbols of a slot, and the second communication resource comprises a second set of symbols of the slot.

Aspect 23: The method of any of aspects 15 through 22, wherein the feedback message is received via the first communication resource based on the feedback message having a higher priority level than an uplink control message scheduled for transmission via the first communication resource.

Aspect 24: The method of any of aspects 15 through 22, further comprising: receiving an uplink control message via the second communication resource based at least in part on the uplink control message having a higher priority level than a second feedback message for the private portion.

Aspect 25: The method of any of aspects 15 through 24, further comprising: transmitting second control signaling indicating a timing offset between communications resources for feedback for common portions of transmissions and communications resources for feedback for private portions of transmissions, and wherein transmitting the control signaling comprises transmitting an indication of a starting time for the first communication resource.

Aspect 26: The method of any of aspects 15 through 25, wherein receiving the control signaling comprises: transmitting a downlink control information scheduling the transmission.

Aspect 27: The method of any of aspects 15 through 26, further comprising: transmitting second control signaling indicating that a RACH message is rate-split, wherein the transmission comprises the RACH message.

Aspect 28: An apparatus for wireless communications at a UE, comprising at least one processor; and memory coupled with the at least one processor, the memory storing instructions executable by the at least one processor to cause the cause the UE to perform a method of any of aspects 1 through 14.

Aspect 29: An apparatus for wireless communications at a UE, comprising at least one means for performing a method of any of aspects 1 through 14.

Aspect 30: A non-transitory computer-readable medium storing code for wireless communication, the code comprising instructions executable by at least one processor to perform a method of any of aspects 1 through 14.

Aspect 31: An apparatus for wireless communications at a network entity, comprising at least one processor; and memory coupled with the at least one processor, the memory storing instructions executable by the at least one processor to cause the cause the network entity to perform a method of any of aspects 15 through 27.

Aspect 32: An apparatus for wireless communications at a network entity, comprising at least one means for performing a method of any of aspects 15 through 27.

Aspect 33: A non-transitory computer-readable medium storing code for wireless communication, the code comprising instructions executable by at least one processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase-change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

at least one processor; and memory coupled with the at least one processor, the memory storing instructions executable by the at least one processor to cause the UE to:

transmit an indication of a first processing time for the UE associated with preparation of feedback for common portions of transmissions and a second processing time for the UE associated with preparation of feedback for private portions of transmissions;

receive, responsive to the indication, control signaling indicating a first communication resource for feedback associated with a common portion of a transmission and a second communication resource for feedback associated with a private portion of the transmission, wherein the second communication resource is subsequent to the first communication resource;

receive the transmission comprising the common portion and the private portion; and transmit a feedback message for the common portion via one of the first communication resource or the second communication resource.

2. The apparatus of claim 1, wherein the instructions are further executable by the at least one processor to cause the UE to:

transmit a second feedback message for the private portion via the second communication resource, wherein transmitting the feedback message for the common portion comprises transmitting the feedback message via the first communication resource.

3. The apparatus of claim 1, wherein the instructions are further executable by the at least one processor to cause the UE to:

cancel a transmission of a second feedback message for the private portion via the second communication resource based at least in part on transmitting the feedback message for the common portion comprising transmitting a negative acknowledgment for the common portion via the first communication resource.

4. The apparatus of claim 1, wherein the instructions are further executable by the at least one processor to cause the UE to:

determine that the first communication resource is unavailable for transmission of the feedback message, wherein transmitting the feedback message for the common portion comprises transmitting the feedback message via the second communication resource; and cancel a transmission of a second feedback message for the private portion via the second communication resource.

5. The apparatus of claim 1, wherein the instructions are further executable by the at least one processor to cause the UE to:

determine that the first communication resource is unavailable for transmission of the feedback message, wherein transmitting the feedback message for the common portion comprises multiplexing the feedback message with a second feedback message for the private portion in a same transmission via the second communication resource.

6. The apparatus of claim 5, wherein the instructions to multiplex the feedback message with the second feedback message are executable by the at least one processor to cause the UE to:

transmit the feedback message via a first subset of communication resources of the second communication resource and transmitting the second feedback message via a second subset of communication resources of the second communication resource.

7. The apparatus of claim 5, wherein the instructions to multiplex the feedback message with the second feedback message are executable by the at least one processor to cause the UE to:

encode the feedback message and the second feedback message in a same codeword using one of a polar encoder or a single cyclic shift.

8. The apparatus of claim 1, wherein the first communication resource comprises a first set of symbols of a slot, and the second communication resource comprises a second set of symbols of the slot.

9. The apparatus of claim 1, wherein the instructions are further executable by the at least one processor to cause the UE to:

cancel a transmission of an uplink control message scheduled for transmission via the first communication resource, wherein the feedback message is transmitted via the first communication resource based on the feedback message having a higher priority level than the uplink control message.

10. The apparatus of claim 1, wherein the instructions are further executable by the at least one processor to cause the UE to:

determine that an uplink control message is scheduled for transmission via the second communication resource;

transmit the uplink control message via the second communication resource based at least in part on the uplink control message having a higher priority level than a second feedback message for the private portion; and cancel a transmission of the second feedback message for the private portion via the second communication resource.

11. The apparatus of claim 1, wherein the instructions are further executable by the at least one processor to cause the UE to:

receive second control signaling indicating a timing offset between communications resources for feedback for common portions of transmissions and communications resources for feedback for private portions of transmissions, and wherein receiving the control signaling comprises receiving an indication of a starting time for the first communication resource.

12. The apparatus of claim 1, wherein the instructions to receive the control signaling are executable by the at least one processor to cause the UE to:

receive a downlink control information scheduling the transmission.

13. The apparatus of claim 1, wherein the instructions are further executable by the at least one processor to cause the UE to:

receive second control signaling indicating that a random access channel message is rate-split, wherein the transmission comprises the random access channel message.

14. An apparatus for wireless communications at a network entity, comprising:

at least one processor; and memory coupled with the at least one processor, the memory storing instructions executable by the at least one processor to cause the network entity to:

receive, from a user equipment (UE), an indication of a first processing time for the UE associated with preparation of feedback for common portions of transmissions and a second processing time for the UE associated with preparation of feedback for private portions of transmissions;

transmit, responsive to the indication, to the UE, control signaling indicating a first communication resource for feedback associated with a common portion of a transmission and a second communication resource for feedback associated with a private portion of the transmission, wherein the second communication resource is subsequent to the first communication resource;

transmit, to the UE, the transmission comprising the common portion and the private portion; and receive, from the UE, a feedback message for the common portion via one of the first communication resource or the second communication resource.

15. The apparatus of claim 14, wherein the instructions are further executable by the at least one processor to cause the network entity to:

receive a second feedback message for the private portion via the second communication resource, wherein receiving the feedback message for the common portion comprises receiving the feedback message via the first communication resource.

16. The apparatus of claim 14, wherein the instructions to receive the feedback message for the common portion are executable by the at least one processor to cause the network entity to:

receive the feedback message via the second communication resource, and wherein a second feedback message for the private portion is not received via the second communication resource.

17. The apparatus of claim 14, wherein the instructions to receive the feedback message for the common portion are executable by the at least one processor to cause the network entity to:

receive the feedback message multiplexed with a second feedback message for the private portion in a same transmission via the second communication resource.

18. The apparatus of claim 17, wherein the instructions to receive the feedback message multiplexed with the second feedback message for the private portion are executable by the at least one processor to cause the network entity to:

receive the feedback message via a first subset of communication resources of the second communication resource and receiving the second feedback message via a second subset of communication resources of the second communication resource.

19. The apparatus of claim 17, wherein the instructions to receive the feedback message multiplexed with the second feedback message for the private portion are executable by the at least one processor to cause the network entity to:

decode the feedback message and the second feedback message in a same codeword using one of a polar encoder or a single cyclic shift.

20. The apparatus of claim 14, wherein the first communication resource comprises a first set of symbols of a slot, and the second communication resource comprises a second set of symbols of the slot.

21. The apparatus of claim 14, wherein the feedback message is received via the first communication resource based on the feedback message having a higher priority level than an uplink control message scheduled for transmission via the first communication resource.

22. The apparatus of claim 14, wherein the instructions are further executable by the at least one processor to cause the network entity to:

receive an uplink control message via the second communication resource based at least in part on the uplink control message having a higher priority level than a second feedback message for the private portion.

23. The apparatus of claim 14, wherein the instructions are further executable by the at least one processor to cause the network entity to:

transmit second control signaling indicating a timing offset between communications resources for feedback for common portions of transmissions and communications resources for feedback for private portions of transmissions, and wherein transmitting the control signaling comprises transmitting an indication of a starting time for the first communication resource.

24. The apparatus of claim 14, wherein the instructions to receive the control signaling are executable by the at least one processor to cause the network entity to:

transmit a downlink control information scheduling the transmission.

25. The apparatus of claim 14, wherein the instructions are further executable by the at least one processor to cause the network entity to:

transmit second control signaling indicating that a random access channel message is rate-split, wherein the transmission comprises the random access channel message.

26. A method for wireless communications at a user equipment (UE), comprising:

transmitting an indication of a first processing time for the UE associated with preparation of feedback for common portions of transmissions and a second processing time for the UE associated with preparation of feedback for private portions of transmissions;

receiving, responsive to the indication, control signaling indicating a first communication resource for feedback associated with a common portion of a transmission and a second communication resource for feedback associated with a private portion of the transmission, wherein the second communication resource is subsequent to the first communication resource;

receiving the transmission comprising the common portion and the private portion; and transmitting a feedback message for the common portion via one of the first communication resource or the second communication resource.

27. A method for wireless communications at a network entity, comprising:

receiving, from a user equipment (UE), an indication of a first processing time for the UE associated with preparation of feedback for common portions of transmissions and a second processing time for the UE associated with preparation of feedback for private portions of transmissions;

transmitting, responsive to the indication, to the UE, control signaling indicating a first communication resource for feedback associated with a common portion of a transmission and a second communication resource for feedback associated with a private portion of the transmission, wherein the second communication resource is subsequent to the first communication resource;

transmitting, to the UE, the transmission comprising the common portion and the private portion; and receiving, from the UE, a feedback message for the common portion via one of the first communication resource or the second communication resource.

* * * * *